United States Patent
Graves et al.

(10) Patent No.: US 9,612,432 B2
(45) Date of Patent: Apr. 4, 2017

(54) DEVICE AND METHOD FOR MICRO-ELECTRO-MECHANICAL-SYSTEM PHOTONIC SWITCH

(71) Applicant: Huawei Technologies Co., Ltd., Shenzhen (CN)

(72) Inventors: Alan Frank Graves, Kanata (CA); Dominic John Goodwill, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/333,930

(22) Filed: Oct. 25, 2016

(65) Prior Publication Data

US 2017/0038577 A1   Feb. 9, 2017

Related U.S. Application Data

(62) Division of application No. 14/086,794, filed on Nov. 21, 2013, now Pat. No. 9,519,136.

(51) Int. Cl.

| G02B 6/26 | (2006.01) |
|---|---|
| G02B 26/08 | (2006.01) |
| G02B 6/35 | (2006.01) |
| G01B 11/27 | (2006.01) |
| G01J 1/44 | (2006.01) |

(52) U.S. Cl.
CPC ........ *G02B 26/0833* (2013.01); *G01B 11/272* (2013.01); *G02B 6/3518* (2013.01); *G01J 1/44* (2013.01); *G01J 2001/446* (2013.01)

(58) Field of Classification Search
CPC .. G02B 6/3556; G02B 6/3588; G02B 6/3512; G02B 6/3586
See application file for complete search history.

(56) References Cited

U.S. PATENT DOCUMENTS

| 6,643,425 B1 | 11/2003 | Bowers et al. |
| 2003/0002783 A1 | 1/2003 | Neilson et al. |
| 2004/0184718 A1 | 9/2004 | Kazama et al. |

(Continued)

FOREIGN PATENT DOCUMENTS

| CN | 1393711 A | 1/2003 |
| CN | 1532574 A | 9/2004 |

(Continued)

*Primary Examiner* — Sung Pak
*Assistant Examiner* — Hoang Tran
(74) *Attorney, Agent, or Firm* — Slater Matsil, LLP

(57) ABSTRACT

In one embodiment, a micro-electro-mechanical-system (MEMS) photonic switch includes a first plurality of collimators including a first collimator configured to receive a first traffic optical beam having a traffic wavelength and a first control optical beam having a control wavelength, where a first focal length of the first collimators at the traffic wavelength is different than a second focal length of the first collimators at the control wavelength. The MEMS photonic switch also includes a first mirror array optically coupled to the first plurality of collimators, where the first mirror array including a first plurality of first MEMS mirrors integrated on a first substrate and a first plurality of first photodiodes integrated on the first substrate, where the photodiodes are disposed in interstitial spaces between the MEMS mirrors.

20 Claims, 26 Drawing Sheets

(56) References Cited

U.S. PATENT DOCUMENTS

2005/0031251 A1* 2/2005 Schroeder ................ G02B 6/32
                                                             385/16
2005/0220394 A1   10/2005 Yamamoto et al.
2007/0230864 A1   10/2007 Ishii et al.
2015/0041629 A1    2/2015 Graves et al.

FOREIGN PATENT DOCUMENTS

| CN | 1677158 A | 10/2005 |
|----|-----------|---------|
| WO | 0214927 A2 | 2/2002 |
| WO | 0214937 A1 | 2/2002 |
| WO | 02086585 A1 | 10/2002 |

* cited by examiner

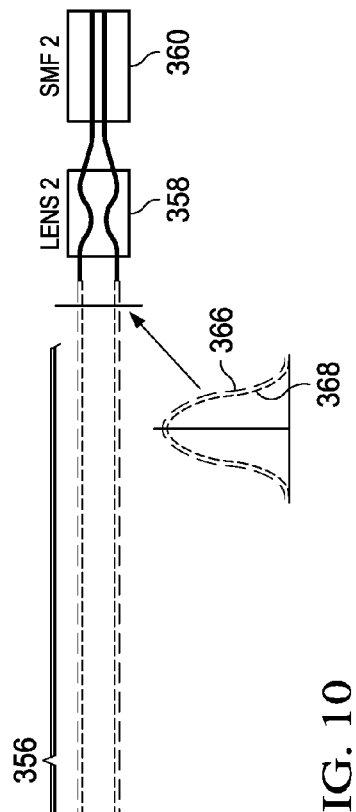
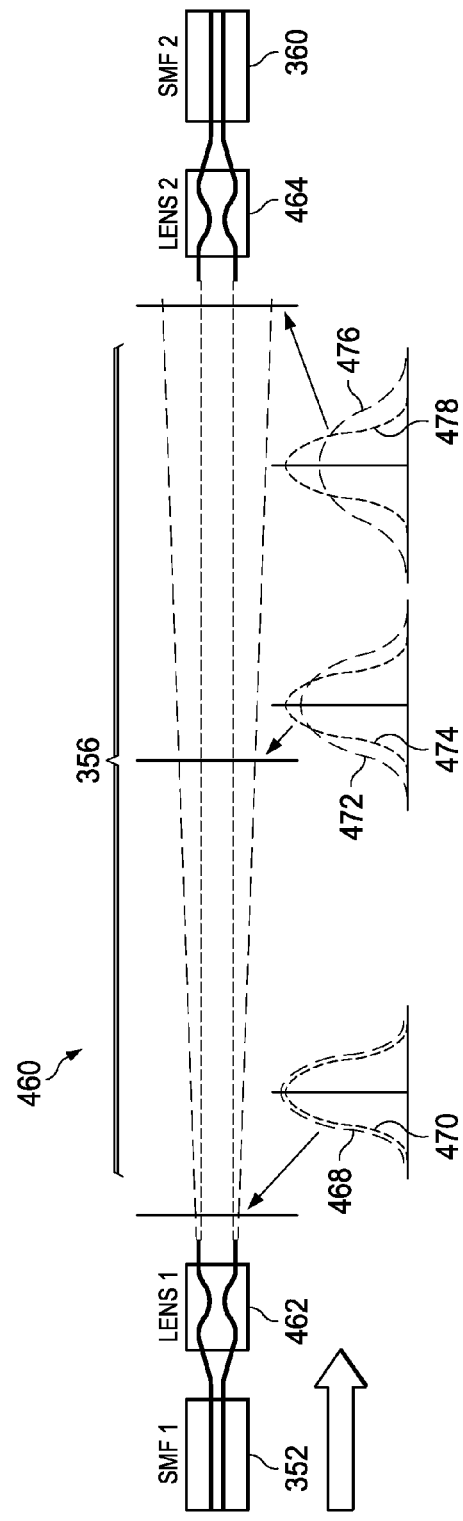
FIG. 10
FIG. 11

DEVICE AND METHOD FOR MICRO-ELECTRO-MECHANICAL-SYSTEM PHOTONIC SWITCH

This application is a divisional of U.S. Non-Provisional patent application Ser. No. 14/086,794 filed on Nov. 21, 2013 and entitled "Device and Method for a Micro-Electro-Mechanical-System Photonic Switch," which is incorporated by reference herein as if reproduced in its entirety.

TECHNICAL FIELD

The present invention relates to photonics, and, in particular, to a device and method for a micro-electro-mechanical-system (MEMS) photonic switch.

BACKGROUND

A type of photonic switch is a three dimensional (3D) micro-electro-mechanical-system (MEMS) photonic switch. MEMS photonic switches have excellent properties, such as the ability to achieve a high port count. Also, MEMS photonic switches have excellent optical properties, such as low loss, low polarization dependence, high linearity, and low noise. Additionally, MEMS photonic switches have excellent off-state properties, such as high isolation and low crosstalk.

However, MEMS photonic switches have some issues that limit their widespread use, such as slow switching speeds, driven by complex methods of control. This is especially problematic when MEMS photonic switches are used in a cascade configuration, such as in a three stage CLOS switch, or to set up a path transiting multiple nodes across a photonic switched network. Also, control methods may leave residual modulation introduced by the switch, which can interfere with the cascading of the switch.

SUMMARY

An embodiment micro-electro-mechanical-system (MEMS) photonic switch includes a first plurality of collimators including a first collimator configured to receive a first traffic optical beam having a traffic wavelength and a first control optical beam having a control wavelength, where a first focal length of the first collimators at the traffic wavelength is different than a second focal length of the first collimators at the control wavelength. The MEMS photonic switch also includes a first mirror array optically coupled to the first plurality of collimators, where the first mirror array including a first plurality of first MEMS mirrors integrated on a first substrate and a first plurality of first photodiodes integrated on the first substrate, where the photodiodes are disposed in interstitial spaces between the MEMS mirrors.

An embodiment method of aligning a first mirror and a second mirror of a micro-electro-mechanical system (MEMS) photonic switch includes receiving, by a first collimator of a first plurality of collimators, a first optical control signal having a control wavelength and receiving, by the first collimator, a first optical traffic signal having a traffic wavelength. The method also includes reflecting, by the first mirror on a first mirror array, the first optical control signal to produce a first optical control beam and reflecting, by the first mirror, the first optical traffic signal to produce a first optical traffic beam. Additionally, the method includes detecting, by a first photodiode having a first location on a second mirror array, a first intensity of a first control beam spot of the first optical control beam to produce a first detected optical signal, where the second mirror array includes the second mirror, and where a first diameter of the first control beam spot is larger than a second diameter of a first traffic beam spot of the first optical traffic beam at the second mirror array.

An embodiment control system includes a first inject optical signal module configured to inject a first control optical signal into a first collimator of a first plurality of collimators of a micro-electro-mechanical system (MEMS) photonic switch to reflect off a first mirror to form a first beam spot on a first MEMS mirror array and a mirror acquisition control unit configured to be coupled to the MEMS photonic switch, where the mirror acquisition control unit is configured to receive a first plurality of signals from a first plurality of interstitial photodiodes associated with the first mirror, where the first plurality of interstitial photodiodes has a first plurality of locations, where the mirror acquisition control unit is configured to detect the first beam spot when the first beam spot is centered on the first mirror. The control system also includes a mirror driver coupled to the mirror acquisition control unit, where the mirror driver is configured to be coupled to the MEMS photonic switch, and where the mirror driver is configured to control a second mirror of a second MEMS mirror array of the MEMS photonic switch in accordance with the first plurality of signals and the first plurality of locations.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 10 illustrates a collimated beam ray diagram for an achromatic lens;

FIG. 11 illustrates a collimated beam ray diagram for a lens with a longer effective focal length at a control wavelength than at a traffic wavelength;

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, photodiodes are interstitially placed on a micro-electro-mechanical-system (MEMS) substrate between mirrors in a MEMS photonic switch. An optical beam at a control wavelength propagates in both directions through the photonic switch, illuminating only the photodiodes on the opposing substrate. Collimators of an array of collimators at the input and output have a different focal length at the control wavelength and a traffic wavelength, so that a beam spot on the second MEMS mirror array at the control wavelength is larger than a beam spot at the traffic wavelength. This is accomplished by using collimators with a different refractive index at the control wavelength and the traffic wavelength. The control beam is centered on and coaxial to the traffic beam. Thus, interstitial photodiodes are illuminated by the control beam, but not by the traffic beam, when the mirrors are aligned.

A three-dimensional (3D) MEMS photonic switch may use one or two arrays of steerable mirrors to form switchable optical paths between collimator arrays. When one mirror array is used, the mirror array is arranged opposite a static planar or near planar retro-reflective mirror. In this example, the control wavelength propagates in both directions through the photonic switch, illuminating only the photodiodes around the second mirror encountered on each control carrier's path.

Figure 1:
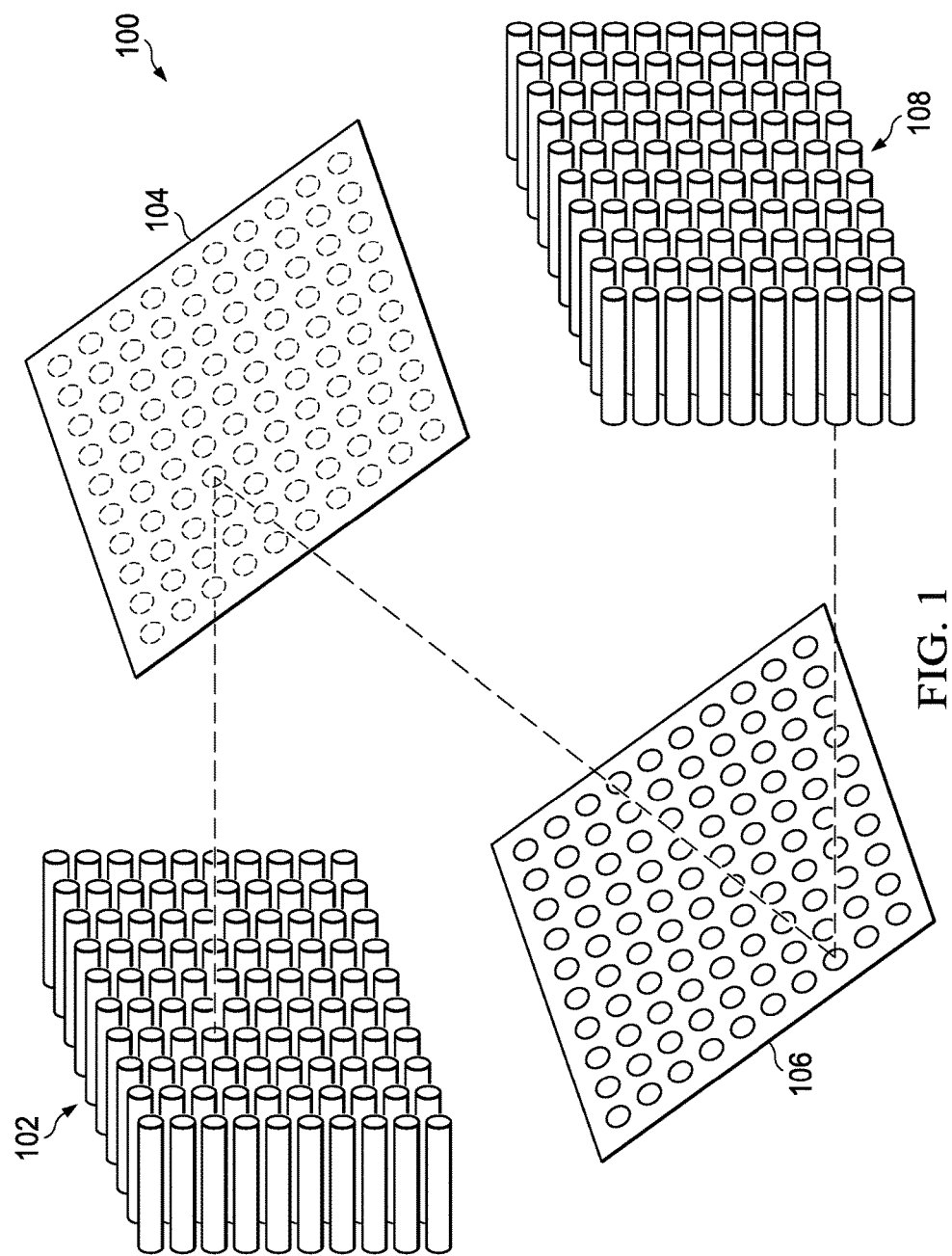
FIG. 1 illustrates an embodiment micro-electro-mechanical-system (MEMS) photonic switch.

FIG. 1 illustrates MEMS photonic switch 100, a three dimensional (3D) MEMS photonic switch with two arrays of steerable mirrors. MEMS photonic switch 100 contains mirror arrays 104 and 106. Light enters via collimator array 102, for example from optical fibers, and impinges on mirrors of mirror array 104. Mirrors of mirror array 104 are adjusted in angle in two planes to cause the light to impinge on the appropriate mirrors of mirror array 106. The mirrors of mirror array 106 are associated with particular output ports of collimator array 108. Also, mirrors of mirror array 106 are adjusted in angle in two planes to cause coupling to the appropriate output port. The light then exits in a collimator of collimator array 108, for example coupling to optical fibers. Similarly, light enters collimator array 108, reflects off mirrors of mirror array 106, reflects off mirrors of mirror array 104, and exits through collimator array 102.

The mirror arrays have arrays of steerable 3D-MEMS mirrors (referred to here as MEMS mirrors) which reflect a beam projected onto them by an associated collimator. The reflected beam is then reflected on an opposing mirror on the opposing mirror array. Thus, an N×N MEMS photonic switching module contains N input mirrors, each of which can access any of N mirrors on the opposing mirror array, and vice versa. This enables the mirror count to grow linearly with the port count of the switch, utilizing 2N steerable mirrors for an N×N switch. For many other methods of building photonic switches, the mirror count or crosspoint count grows as the square of the port count. Thus, MEMS photonic switches are able to scale to a large port count, while some other approaches are limited by mirror count or crosspoint count. However, as the port count grows in a MEMS photonic switch, the suitable minimum optical path length between the mirrors and/or the suitable maximum mirror deflection angle increases.

Figure 2:
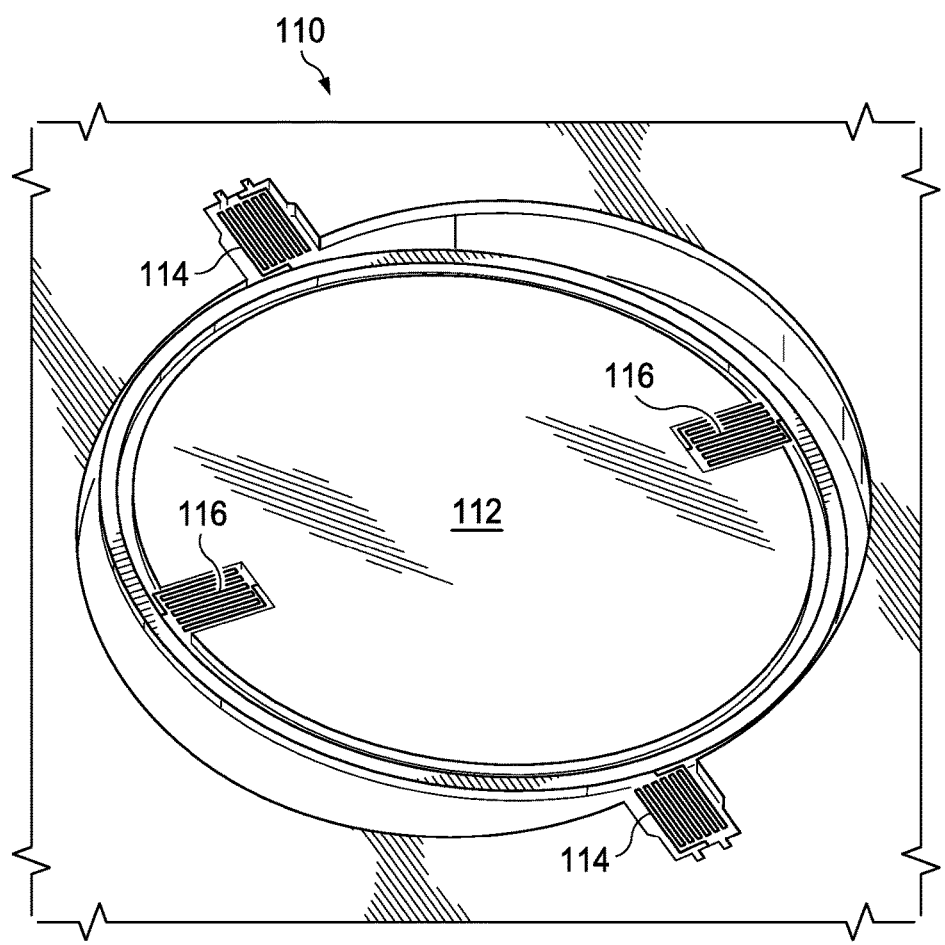
FIG. 2 illustrates an embodiment MEMS mirror structure.

The MEMS mirrors in MEMS photonic switch 100 are fabricated in a modified silicon wafer process. FIG. 2 illustrates an example MEMS mirror structure 110, which may have a diameter from about 550 μm to about 2.5 mm, for example around 1 mm. MEMS mirror structure 110 contains mirror 112 suspended on two axes of bearings 114 and 116 to allow it to tilt against the torsion spring actions of the bearings, which try to maintain mirror 112 in a particular position. Below mirror 112, from about 80 µm to 100 µm for a 1 mm mirror, are three or four segmented plate deflection electrodes. When four electrodes are used, each electrode may be associated with a mirror quadrant. When a voltage is applied to an electrode, mirror 112 is attracted towards that electrode by electrostatic attraction, and twists against the spring action of the silicon torsion springs. This deflection may be steered in both angular direction and magnitude by adjusting an applied drive voltage on one or more of the electrodes. Drive voltages may be up to a few hundred volts, with a maximum mirror deflection of five to seven degrees out-of-plane, for a maximum beam deviation of ten to fourteen degrees from the rest state, or a twenty to twenty eight degree peak to peak beam deviation.

Figure 3:
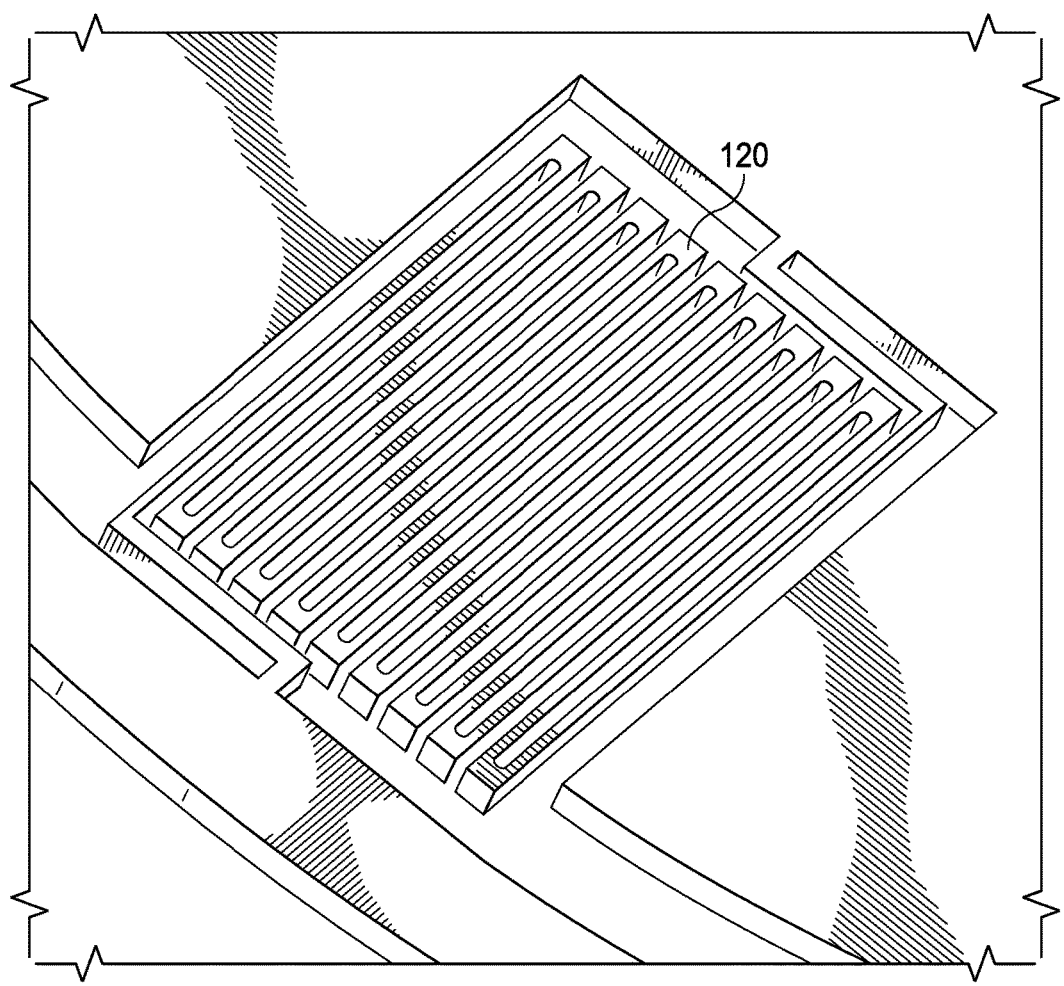
FIG. 3 illustrates embodiment gimbals for MEMS mirrors.

FIG. 3 illustrates gimbal 120, an example of a gimbal that may be used as bearings 114 or bearings 116. Gimbal 120 may be fabricated from silicon torsion springs, which try to return the mirror to its planar position. The attractive force of the drive voltage on one or more quadrant electrodes versus the increasing spring tension forces as the mirror is moved determines the final pointing angle of the mirror.

Figure 4:
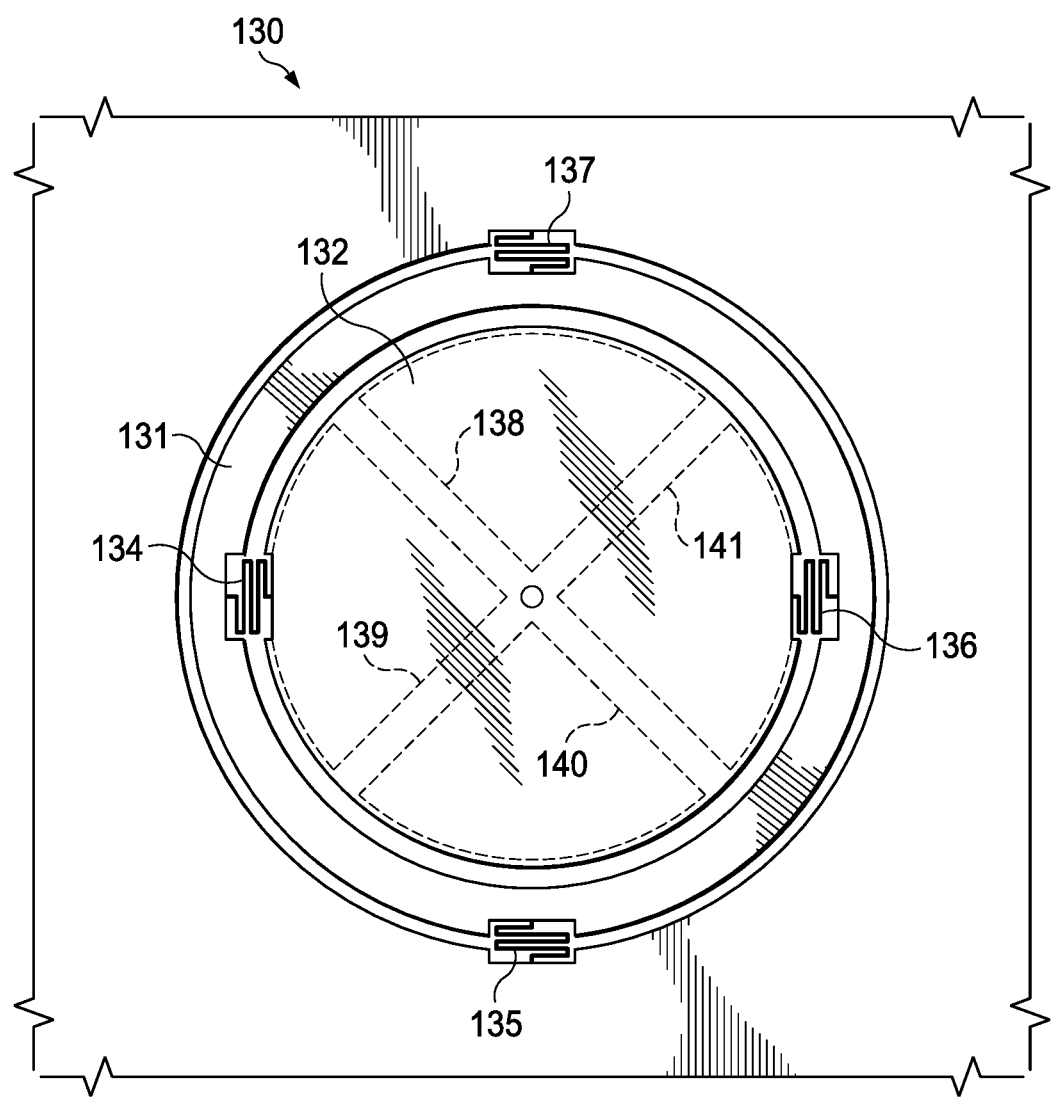
FIG. 4 illustrates another embodiment MEMS mirror structure.

FIG. 4 illustrates mirror structure 130, which contains gimbaled moveable mirror 132 supported by a gimbal ring 131 with y-axis pivoting and x-axis pivoting. Movement in the x-axis is facilitated by springs 135 and 137 which act as pivots, and movement in the y-axis is facilitated by springs 134 and 136, which act as pivots in the orthogonal axis.

The deflection angle of the mirror is adjusted along these two axes, formed between springs 135 and 137, and between 134 and 136 by using quadrant electrodes 138, 139, 140, and 141. Applying a drive voltage to electrode 138 causes the mirror to be attracted toward that electrode, causing the mirror to twist against the spring action of springs 135 and 137, until the attractive force of the electrodes is balanced by the torsion force of the spring, resulting in a negative x mirror deflection. In a similar manner, drive voltages applied separately to electrodes 139, 140 and 141 can produce a negative y, positive x, or positive y deflection. The attractive force is proportional to the electric field (potential difference between the mirror and the electrode divided by the gap between the mirror and the electrode). Hence, for a ground potential mirror, the polarity of the electric field, and hence the drive voltage on the mirror, is insignificant, and the opposite pairs of electrodes are not driven differentially. However, one or the other of the electrodes in the x-axis and one or the other of the electrodes in the y-axis can be driven to produce deflection angles containing any combination of x and y components. The mirror can be pointed to "all points of the compass" by a suitable combination of x and y electrode drive voltages and "+"/"−" electrode selections.

The alignment of mirrors in MEMS photonic switches may be controlled by analyzing the output light. Until the output port receives at least some light from the input port, light cannot be detected, and therefore alignment cannot be optimized. Thus, it is desirable that an initial blind connection be set up to achieve some light on the output port. This can be achieved by a complex method involving pre-measurements of deflection voltages required to produce specific deflection angles and a cyclic hunting approach, known as precession. These values are stored for future reference and use. During the MEMS array/module manufacturing process or equipment field commissioning, each MEMS mirror in each array is linked to every mirror in the opposing array by a trial and error approach. The x and y drive voltages are ramped around the expected drive voltage until a connection is made. The x and y drive voltages for connecting each mirror to every mirror on the opposing mirror array are then stored. This is a time-consuming and hence potentially expensive activity, and can generate large tables of values. Hence, using an analog drive, analog angle deflection system, the initial manufacturing or commissioning setup uses drive voltages to link every other mirror in the array. A detailed look-up table with drive voltages for the alignment of each mirror of one mirror array with each mirror on the opposing mirror array may be created in this manner, either during manufacturing testing or as part of a commissioning process and stored in memory. Alternatively when extremely consistent mirror deflection sensitivity is combined with a complex precision computation algorithm, the initial approximate drive voltages can be computed directly.

Once the mirror pair connectivity has been approximately aligned, such that light passes over the path from the input to the output, but the optimal performance has not been obtained, and detection of output power indicates that the link has been acquired. However, the acquired link is not optimized, and partial illumination of the face of the output collimator (or of the second mirror) will produce an output—but with significant impairment. Hence, the connection may now be optimized. This optimization involves moving the mirrors to the point of the lowest path loss. Once the optical path is acquired, a low optical power indicates that the path is not optimized. However, this only provides an approximate indication of the amplitude of the error, and provides no information about the direction of the error.

A control design may be used to align mirrors by applying precession in an orbital movement to the mirrors by superimposing a small level of sine wave and cosine wave modulation to the x and y plate drive voltages, respectively. This causes the mirror positions to very slightly precess around their nominal position, causing minor circular modulation of the mirror angles. The output light has an amplitude modulation at the precession frequency. The amplitude of this modulation provides an estimate for the size of the error, while the phase of the modulation indicates how much of the error was contributed to by the sine wave modulation and how much was contributed to by the cosine wave modulation. A correction vector may then be calculated to better align the mirror pairs. By using different precession frequencies for the opposing mirror arrays, measurements of the frequency of the precession signal indicate which mirror needs to be corrected. Alternatively, precession may be performed separately and sequentially on each mirror array. The latter method has a longer optimization process.

An initial approximate alignment may be based on a look-up table with drive voltages for aligning each mirror of one mirror array with each mirror of the opposing mirror array. The look-up table is extremely large. For example, for a MEMS photonic switch with 1000×1000 mirrors, there are four million entries in the look-up table with 1000 mirrors per array multiplied by 1000 x-angle drive voltages and 1000 y-angle drive voltages per mirror, multiplied by two arrays. Then, coarse orbital precession may be performed, until an initial alignment is established and there is a significant amount of output light. Next, fine precession is performed to optimize the alignment. Periodic in-service fine precession is performed to maintain alignment during operation.

During initial alignment, when the initial alignment of the mirrors does not produce any light on the desired output port alignment or insufficient light is on the desired output port, the precession signal may be ramped up, causing the mirror angle to spiral outwards around the initial angle, eventually producing light on the desired output in coarse precession. The timing and phasing of the output signal may be used to compute a correction vector. Once the optical path is approximately aligned on the output port, fine precession at a lower precession amplitude, combined with measuring the amplitude and angle of modulation of the output light, may be used in a control loop to further align the mirror pair.

Figure 5:
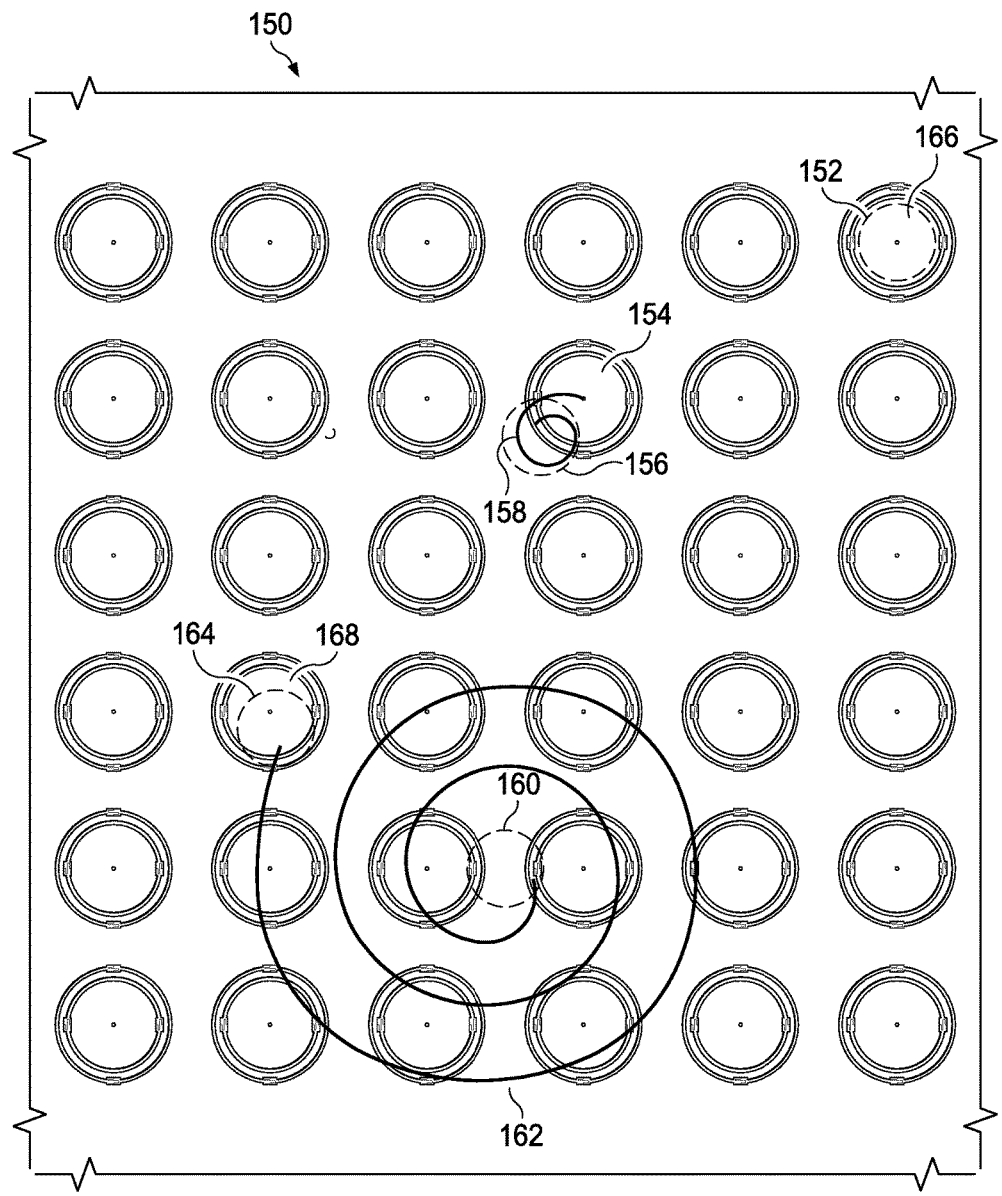
FIG. 5 illustrates optical beam spots on an embodiment MEMS mirror array.

FIG. 5 illustrates mirror array 150. Initially, light beam 156 falls partially outside of target mirror 154. The light beam angle is varied in precession pattern 158 using fine precession to align it on target mirror 154. Also pictured, light beam 152 is properly aligned on target mirror 166.

Light beam 156 was initially aligned from a precise look-up table with a small error. For a 100×100 mirror array, a look-up table has to store the x axis and y axis drive voltages for each mirror in a mirror array to point at each mirror of the opposing array has a table of 2*100*100*2=40,000 drive voltage levels. For a 1000×1000 mirror array, there are 4 million drive voltage measurements. Additionally, it is time consuming to determine the look-up table entries, and the look-up table does not take into account drift or aging. As devices age, these the drive voltages may shift, leading to a more approximate initial alignment. When the initial alignment drifts far, some level of coarse precession may be used. Alternatively, a mechanism to automatically update the table contents with the latest values from the actual optimized settings may be used. This may be problematic when the period between the uses of a particular mirror pair combination is very large. The initial look-up table values are generated by measuring them at manufacturing or commissioning. About ten to thirty values may be measured in a second, leading to a 1300 to 4000 second measurement for a 100×100 array, and a 130,000 to 400,000 seconds (35-110 hours) for a 1000×1000 array.

When the light from the initial blind mirror positioning falls far from the desired mirror, a larger spiral pattern with coarse precession may be used before fine precession. Light beam 160 is initially aligned using an approximate calculation or from a look-up table with a large error. Light beam 160 is a few mirror lengths away from, not close to, target mirror 168. The light beam is precessed using spiral pattern 162, until light beam 164 is close to target mirror 168. Spiral pattern 162, as pictured, is coarser than a spiral that would actually be used for coarse precession for illustration. After coarse precession, a smaller precession pattern is used to better align the mirror pairs. If a precession rate of 1-2 kHz is used for one mirror, a precession rate of about 50 Hz or a non-harmonic frequency in the 1-2 kHz range is used for the opposing mirror. This may be a long process that crosses several non-target mirror sites, because all combinations of both mirror precessions may be needed for the optical beam to illuminate the target mirror.

Using coarse precession and fine precession may be complex. Also, the control loop may be slow. The control loop has to acquire an optical signal before it can set up optical connections. The precession frequency is at a low frequency that the mirrors can follow without a significant positional lag, for example from about 300 Hz to less than about 2 kHz, limited by the fidelity of the MEMS mirror movement staying in phase with the modulation, with a slow control loop and a relatively long optical path optimization time, for example tens or hundreds of milliseconds. The control loop is low bandwidth. When the mean position of the mirror is controlled by a fast-edged drive signal the mirror position experiences ringing or bouncing. The effects of vibrations are not controlled, because their high frequencies of from about 1 kHz to about 10 kHz are outside the control loop bandwidth. Hence, the application of a drive signal should be sufficiently slow to avoid triggering this mechanical resonance. This limits the switching speed as well as the precession speed, since the relationship between the precession signal phase and the mirror angular pointing phase is very uncertain near a mechanical resonance. To extract a sufficiently large precession envelope signal, significant optical power should be available at the switch output, which may limit the lower end of the dynamic range of the optical power switched through the fabric.

The optical signal used in coarse and fine precession from an external source may contain any form of data modulation, since it may be a modulated traffic signal, with a high level of broadband spectral components to its modulation. Using this optical signal to control and correct the mirror settings during alignment or to monitor and correct tracking activity once the mirrors are aligned, may be problematic. Any traffic modulation component of the optical signal power at a frequency close to the mirror precession frequency may mimic a detected precession error, causing an unnecessary and inaccurate resetting of mirror angles. This leads to error conditions in the control system or a high interferer to precession component levels and possible degradation or loss of control. Because the form of the traffic information and its modulation is unknown, the band-limited noise contribution from the part of the carrier signal spectrum that falls within the pass band of the precession modulation control system is unknown. Hence, the control circuit is designed to be as low bandwidth as possible to minimize the potential for interference from traffic spectral components, leading to slow detection of precession signal changes and slow operation.

In an embodiment, a 3-D MEMS photonic switch uses internal photodiodes on the MEMS mirror matrices and an expanded beam at the control wavelength so alignment may be achieved without output port precession based control and without an ultra-precise previously measured look up table or the use of complex changing coarse precession. Real-time mirror alignment is established and maintained without the use of beam precession or beam dithering. It operates during set up, acquisition, optimization, and optimization in-service monitoring and maintenance phase.

Figure 6:
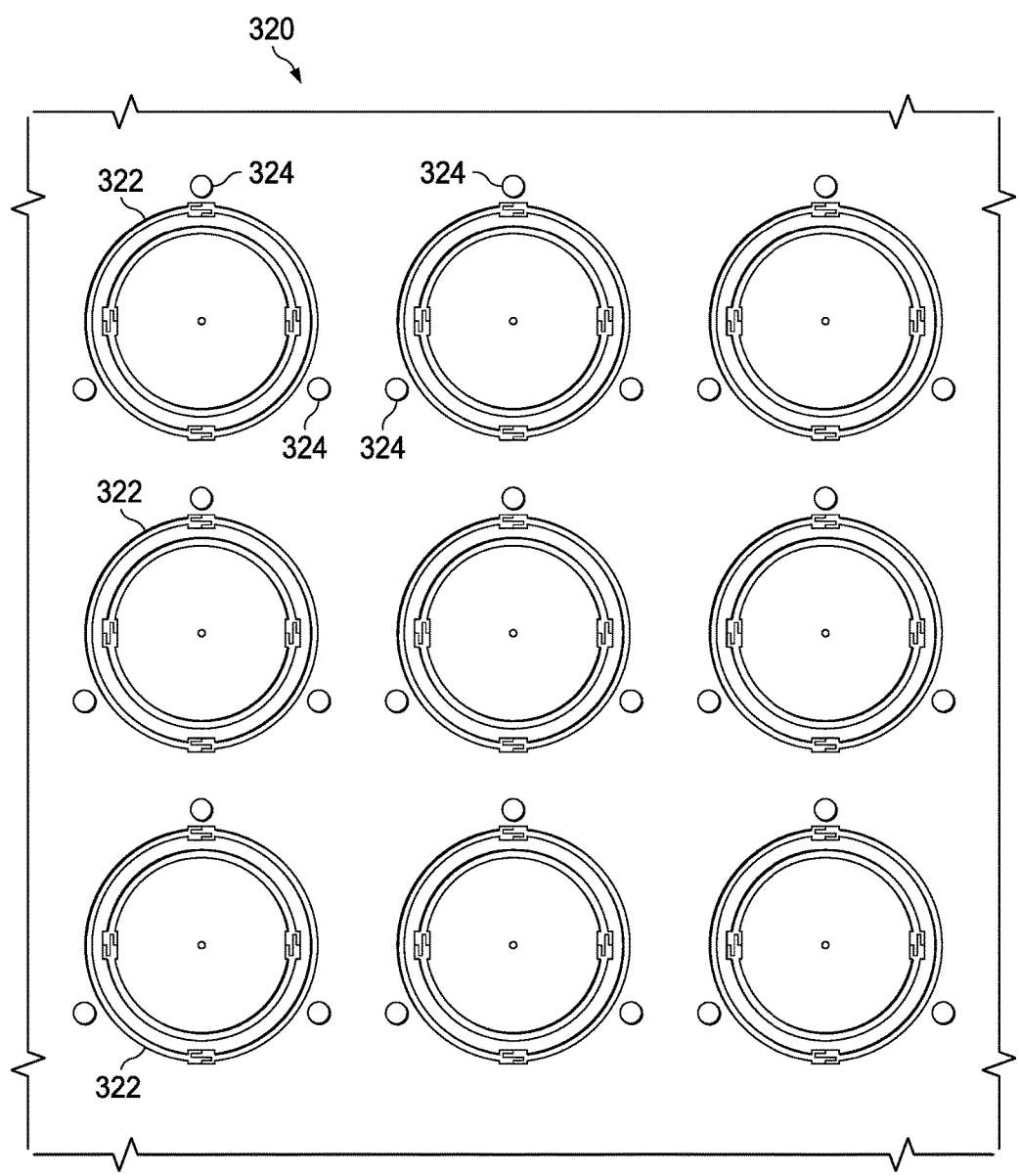
FIG. 6 illustrates an embodiment MEMS mirror array with interstitial photodiodes.
Figure 7:
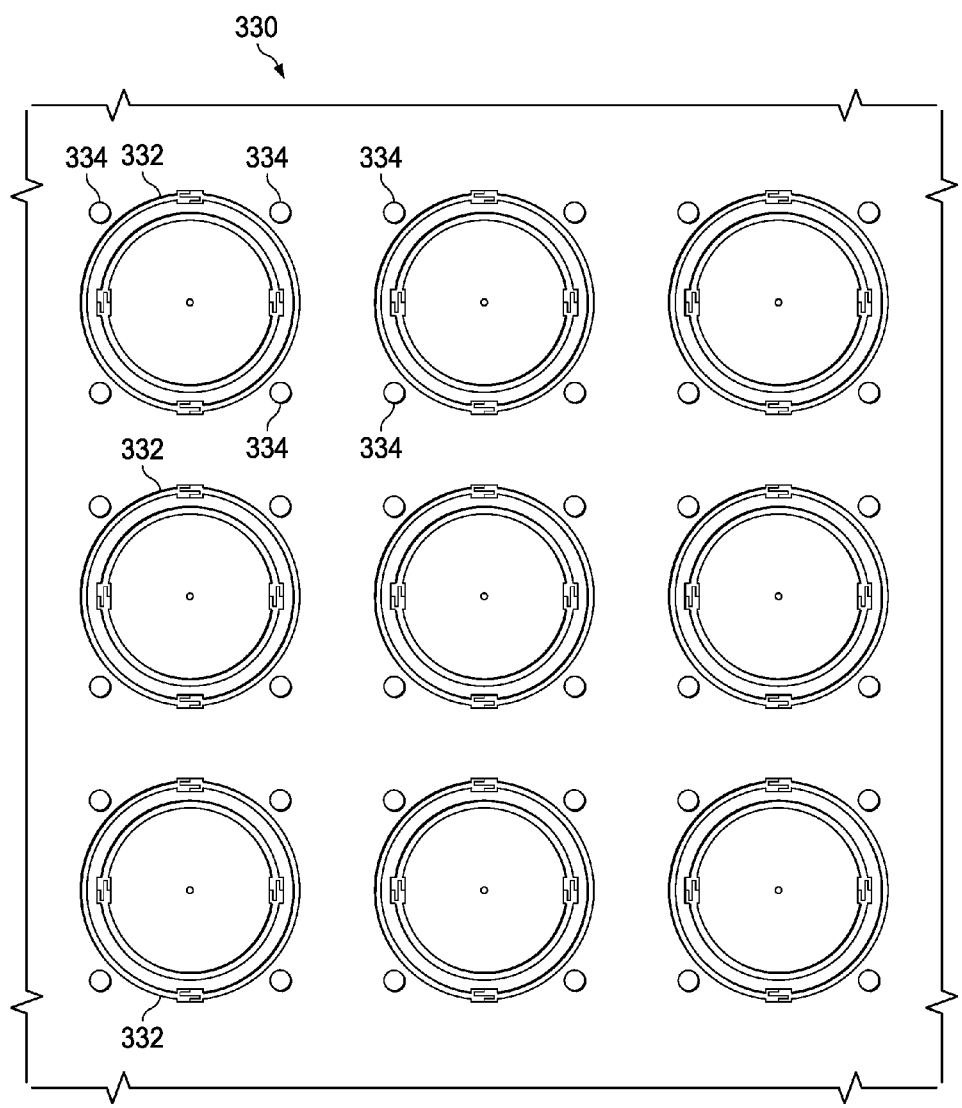
FIG. 7 illustrates another embodiment MEMS mirror array with interstitial photodiodes.
Figure 8:
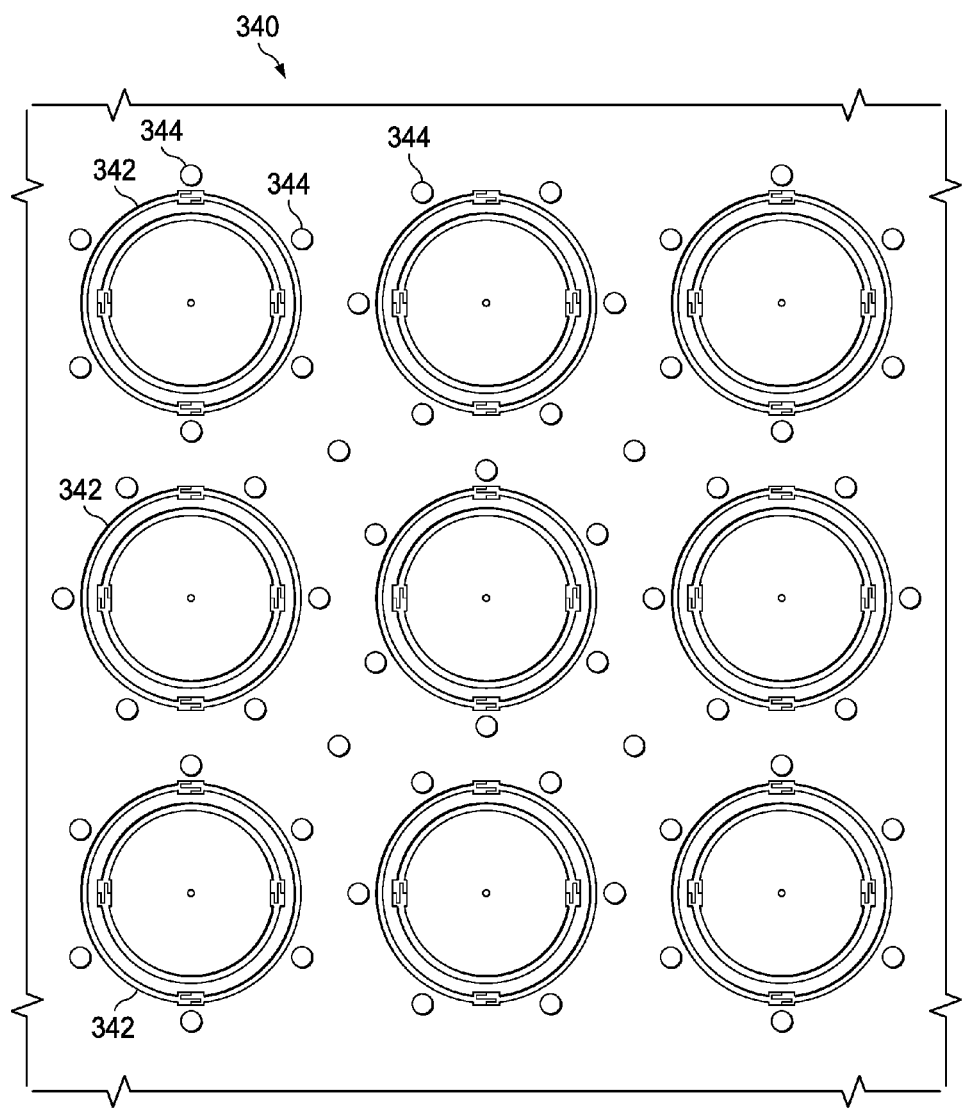
FIG. 8 illustrates an additional embodiment MEMS mirror array with interstitial photodiodes.

An array of photodiodes is placed as an interstitial array between the mirrors in the mirror array to provide a detection grid of optical detectors across the mirror array. In an example, the photodiodes are associated with a particular mirror. FIGS. 6, 7, and 8 illustrate MEMS arrays 320, 330, and 340, respectively. In MEMS array 320, photodiodes 324 are arranged in triangles around MEMS mirrors 322, while in MEMS array 330, photodiodes 334 are arranged in a square around MEMS mirrors 332. Also, in MEMS array 340, photodiodes 344 are arranged in a modified hexagonal configuration around MEMS mirrors 342. Other photodiode arrangements are possible. For example, five, seven, eight, or more photodiodes may be arranged around and associated with a MEMS mirror. The mirror arrays have a series of rows and columns of 3D MEMS two axis steerable micromirrors, for example 0.5 to 1.5 mm in diameter. In an example, the mirrors are 1 mm, and the photodiodes are 50 µm. Placing the photodiodes so they are associated with a particular mirror may involve placing the mirrors slightly further apart than they would be without photodiodes or with interstitial photodiodes that are not associated with a particular mirror.

Figure 9:
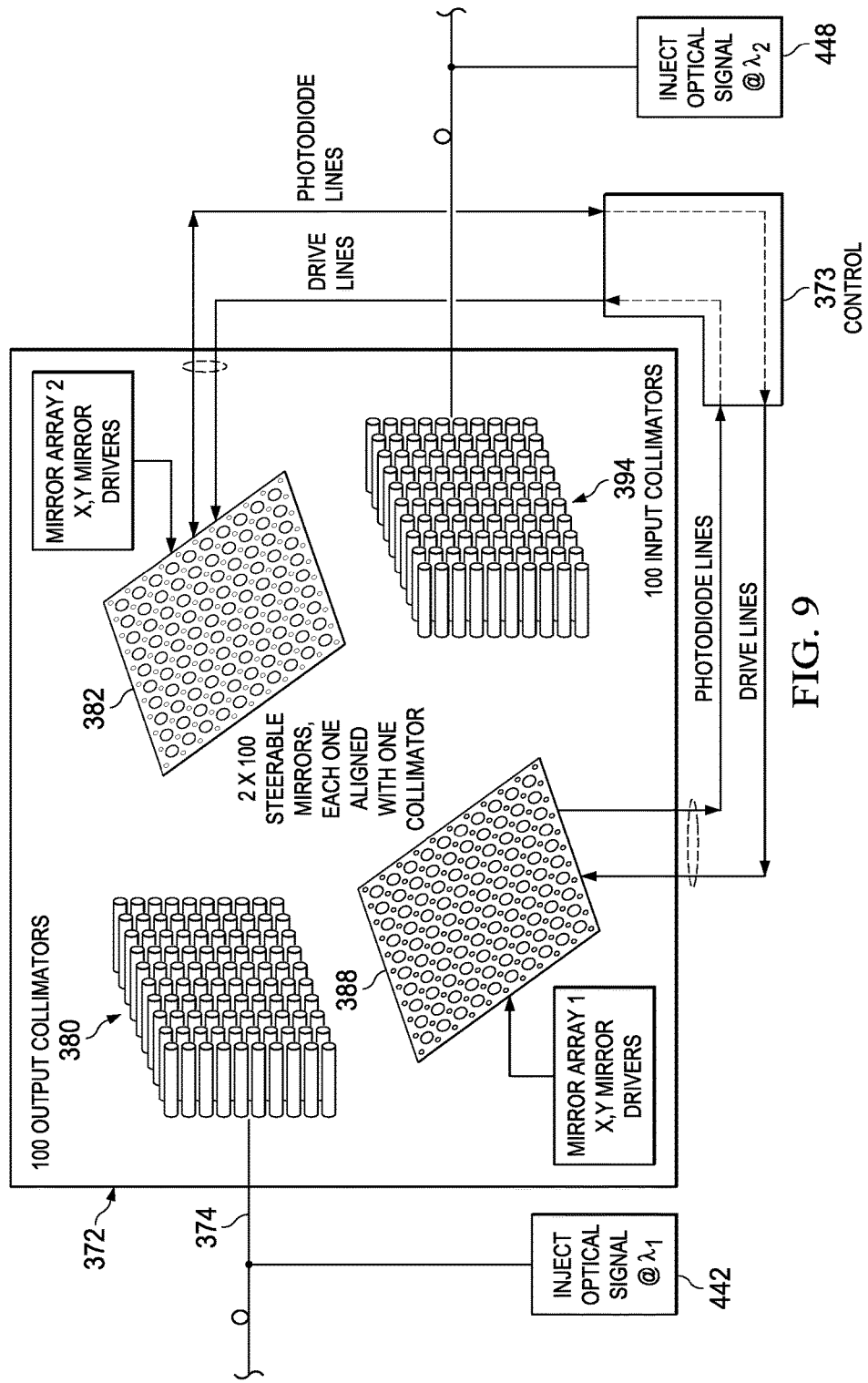
FIG. 9 illustrates an embodiment MEMS module with interstitial photodiodes.

FIG. 9 illustrates MEMS module 372. In an example, the array of mirrors is a 100×100 matrix of MEMS mirrors. The mirror arrays may be MEMS array 320, 330, or 340 or other structures. The traffic light on optical fibers 374 and 396 is overlaid with control light at an out-of-band wavelength in both directions through the mirror chamber by coupling control light into the fiber on both the inputs and outputs. The input fiber connections are terminated on an array of input collimators 380 that produce parallel beams of light from the light in the fiber. The input fiber collimators act as lenses, creating expanded parallel sided collimated beams of a diameter slightly smaller than the MEMS mirror diameter, for example, a beam diameter of 0.45-1.3 mm, at the traffic optical carrier wavelengths, which are projected on to mirrors the mirror array, for example mirror array 388. At the control wavelengths, these beams are either slightly divergent or slightly convergent. When the control beams are convergent, the focal point is early in the optical path. After the focal point, the control beam is divergent. This wavelength dependent convergence or divergence may be achieved by exploiting the wavelength dependence of the refractive indices of the glasses in the collimators, thereby creating wavelength-dependent collimating lens focal lengths. This creates a parallel sided collimated beam at one range of wavelengths but a divergent or convergent beam at another range of wavelengths. The output collimator block 394 is similarly aligned to mirror array 382. When light is injected in the output collimator, the parallel collimated beam center aligns with the center of the respective mirror. The collimators project a nominally parallel beam at traffic wavelengths if a reverse path traffic signal is present, but a convergent or divergent beam at the control optical carrier wavelength.

The mirror arrays and their respective collimator arrays are placed on either side of an empty optical cavity of sufficient size to enable each mirror on one mirror array to point at each mirror on the opposing mirror array. Alternatively, the optical cavity has one or more large plane or curved mirror for folding long inter-mirror array optical paths into a smaller physical space.

The mirrors may be aimed or steered by applying a drive voltage to three or four segmented electrodes under the mirrors. The electrodes may be spaced about 80 to 100 microns from the mirrors. By applying different voltages to the segments, the mirrors may be pointed at an angle within their maximum deflection range. For example, the maximum deflection range may be about plus or minus five to seven degrees in both the x and y planes using the electrostatic forces from the applied electrode voltages to deflect the mirror against the spring tension of the gimbal mounts, which are trying to retain the mirror in its original plane. The drive lines to these electrodes are brought out of the mirror chamber.

The mirror arrays also contain photodiodes placed around the periphery of the MEMS mirrors. The photodiodes form a mesh of detectors across the face of the mirror array, facilitating the direct detection of an actual beam landing placement during the initial connection stages of switch connection establishment. The photodiodes act as mirror-associated optical control power sensors for the optimization and ongoing maintenance of an optimized link in service. The lines to these photodiodes are also tracked out. To avoid bringing out hundreds of low amplitude signals, the photodiode outputs may be amplified, digitized, and/or multiplexed in electronics physically associated on the mirror array. The on-array electronics may be on the front face of an extended mirror array substrate or on the reverse surface of the substrate, created by monolithic or hybridization techniques.

Controller 373 controls the opposite mirror via drive lines based on the output from the photodiodes from the opposing mirror. When the appropriate mirrors are aligned to form an optical path, the traffic beam will only illuminate the target mirrors and the output collimator face, but the coaxial expanded control beams will be evenly illuminating the photodiodes associated with the target mirror in the optical path. The photodiodes around the first mirror in the optical path are not illuminated, hence the need for a bidirectional control optical carrier feed to illuminate the first mirror. The measurement of the evenness of the illumination of the photodiodes associated with the target mirror from the control optical carrier provides the mirror pointing optimization detection during set up and ongoing maintenance. This evenness is tolerant of some variation of the actual diameter of the control beam at the mirror site, but requires the control optical beam to be accurately coaxial with the traffic optical carrier collimated beam. That is, the two beam spots on any interposed surface are concentric.

Bidirectional control beams facilitate the simultaneous and independent initial alignment of opposing mirrors in the optical path, so the control beams are illuminating photodiodes around the opposing target mirror evenly. Thus, the mirror chamber module contains two banks of collimators which are precision aligned with the mirrors of their respective mirror arrays, such that light from the fibers of the collimator arrays form a beam with a central axis which passes through the center of their respective mirrors of the mirror arrays. These collimator arrays project collimated beams at traffic optical wavelengths and coaxial beams at the control optical wavelengths. The traffic beams may be parallel beams or very slightly waisted to compensate for Gaussian beam spread. The control optical beams are either slightly divergent or are convergent, being focused to a point near the launch collimator beyond which the control beam is divergent, producing a beam spot on the second mirror array that overlaps the mirror and the surrounding photodiodes with a larger control beam spot than the traffic beam spot. The beam spots are produced from the same lens by changes in refractive index of the lens material with wavelength, and hence are concentric. Thus, when the beams are aligned, the traffic beam is contained by the mirror and the control beam evenly illuminates the photodiodes associated with the mirror.

When a control beam from the input collimators is reflected by the first mirror it is projected on or near the target mirror on the second mirror array. The first mirror has a diameter sufficient to reflect the traffic beam and the control beam. The photodiodes around the target mirror or nearby mirrors within the zone of uncertainty determine the resultant beam spot placement. The zone of uncertainty is a zone around a target mirror where the beam may initially land, for instance as a result of an initial blind calculated mirror pointing. The photodiode response enables a control system to compute the landing positional error and a correction vector to better align the traffic beam. When the mirror is aligned, the target mirror's photodiodes are approximately equally illuminated by the control beam. A change in this uniform illumination may be rapidly compensated for by the control system to maintain alignment during operation. Alignment may be obtained and maintained without dithering or precession.

Meanwhile, the control beam from the opposing port operates in the same way in the reverse direction to control the mirror of the opposing mirror array.

Inject optical signal blocks 444 and 448 and receive optical signal blocks 442 and 446 are coupled to MEMS module 372. Receive optical signal blocks 442 and 446, which are optional, confirm that the cross switch optical loss is low. Also, receive optical signal blocks are useful if the control optical channel is modulated at the input with an identity marker or identity word specific to a given input. The control optical receiver on the target output port can confirm the receipt of that identity marker or word validating the cross-switch connection mapping.

Inject optical signal blocks 444 and 448 are optical alignment sources which are injected from opposite sides of the system and counter-propagate across MEMS module 372. The optical alignment source is injected into the fibers, for example using an optical combiner. The optical alignment sources contain light from one or more lasers. A dedicated laser is not necessary, because the control power may be low relative to a laser's power output, as one laser can drive multiple inputs via an optical splitter. Optical fibers 374 and 396 are single mode at both the control wavelength and the traffic wavelength. The control wavelength may be a shorter wavelength than the traffic wavelength. For example, the control wavelength may be in the 800-850 nm or 905-1040 nm bandwidth range when traffic is in the 1550 nm telecommunications band or the 1300 telecommunications band.

Additional details on a MEMS photonic switch with interstitial photodiodes are disclosed by the U.S. patent application Ser. No. 13/964,437 entitled "Device and Method for Micro-Electro-Mechanical-System Photonic Switch" filed on Aug. 12, 2013 which application is hereby incorporated herein by reference.

Figure 12:
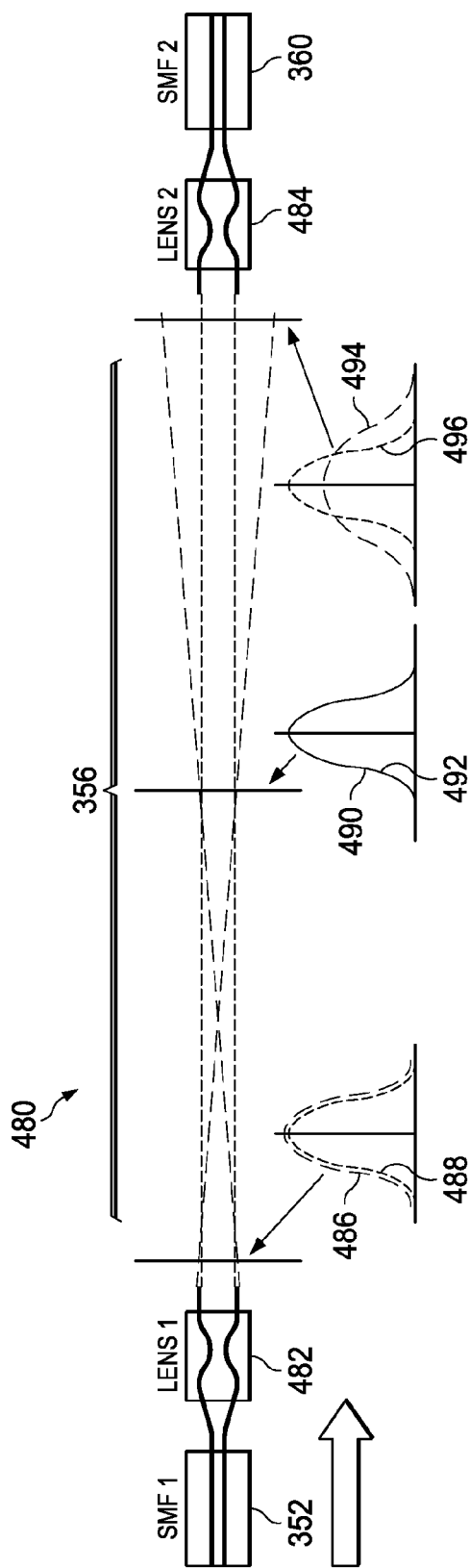
FIG. 12 illustrates a collimated beam ray diagram for a lens with a shorter effective focal length at a control wavelength.

FIGS. 10, 11, and 12 illustrate collimated beam ray diagrams for various lenses. Ray diagrams are illustrated, but the actual beams will have Gaussian beam cross sectional intensities and may exhibit some spreading. FIG. 10 illustrates ray diagram 350 for an achromatic lens. Light propagates from single mode fiber (SMF) 352 and lens 354 through MEMS switch 356. The light then exits through lens 358 to single mode fiber 360. At the input of MEMS switch 356, control beam 362 and traffic beam 364 have similar spot distributions. At the output, control beam 366 and traffic beam 368 also have similar spot distributions. Because lens 354 is achromatic, it creates similarly sized coaxial beams it produces two concentric and overlaid beams.

FIG. 11 illustrates ray diagram 460 with lenses that have an effective focal length that is longer at the control wavelength than at the traffic wavelength. Light propagates from single mode fiber 352 to lens 462 through MEMS switch 356. The light exits through lens 464 to single mode fiber 360. The control beam expands with distance relative to the traffic beam, while remaining coaxial with the traffic beam. At the entrance control beam 468 has a similar spot size to traffic beam 470. At the midpoint, control beam 472 has expanded relative to traffic beam 474. At the exit, control beam 476 has further expanded relative to control beam 478. The control beam and traffic beam are coaxial.

FIG. 12 illustrates ray diagram 480 with lenses that have an effective focal length that is shorter at the control wavelength than at the traffic wavelength. Light propagates from single mode fiber 352 to lens 482 through MEMS switch 356. Light then exits lens 484 to single mode fiber 360. At the input the spot size is similar for control beam 486 and traffic beam 488. Lens 482 produces a convergent beam at the control wavelength that is coaxial to the traffic beam. The control beams comes to a focal point before expanding beyond that focal point. At the midpoint, control beam 490 is approximately the same size as traffic beam 492, as illustrated. However, the control beam may be smaller or bigger, depending on the focal lengths and the optical path length. At the output, control beam 494 is larger than traffic beam 496.

Figure 13:
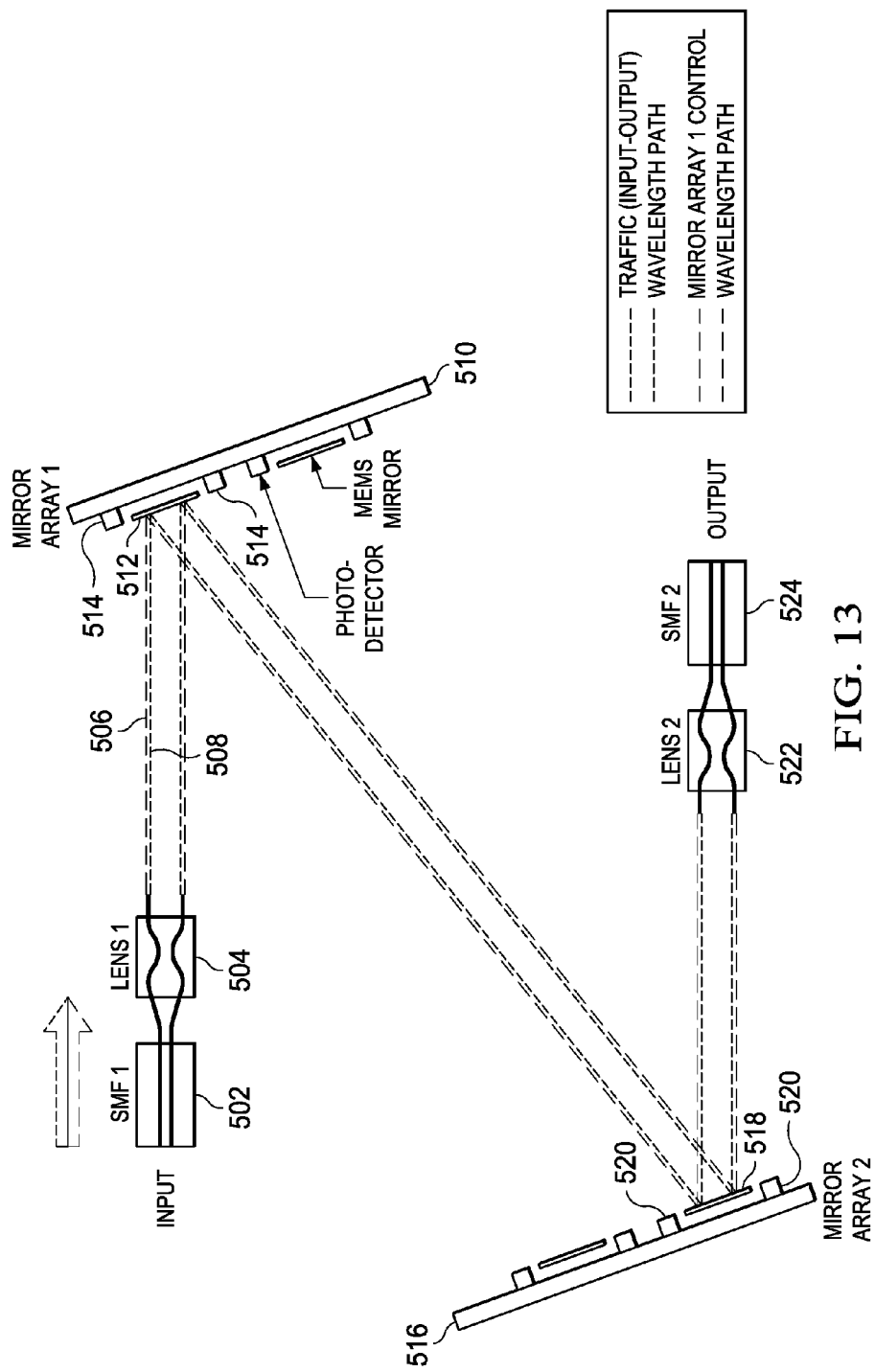
FIG. 13 illustrates an embodiment MEMS module with achromatic collimators.

FIG. 13 illustrates a traffic beam and a control beam projected as collimated beams across a MEMS switch. Control beam 506 and traffic beam 508 enter through single mode fiber 502 and lens 504 and are projected on mirror 512 of mirror array 510. Photodiodes 514 are around mirror 512. Control beam 506 and traffic beam 508 are reflected off mirror 512 to mirror 518 on mirror array 516, with photodiodes 520 surrounding mirror 518. The two beams exit through lens 522 to single mode fiber 524. Photodiodes 514 and 520 are not illuminated when control beam 506 and traffic beam 508 are centered on mirrors 512 and 518, respectively, because lens 504 and lens 522 are achromatic.

Figure 14:
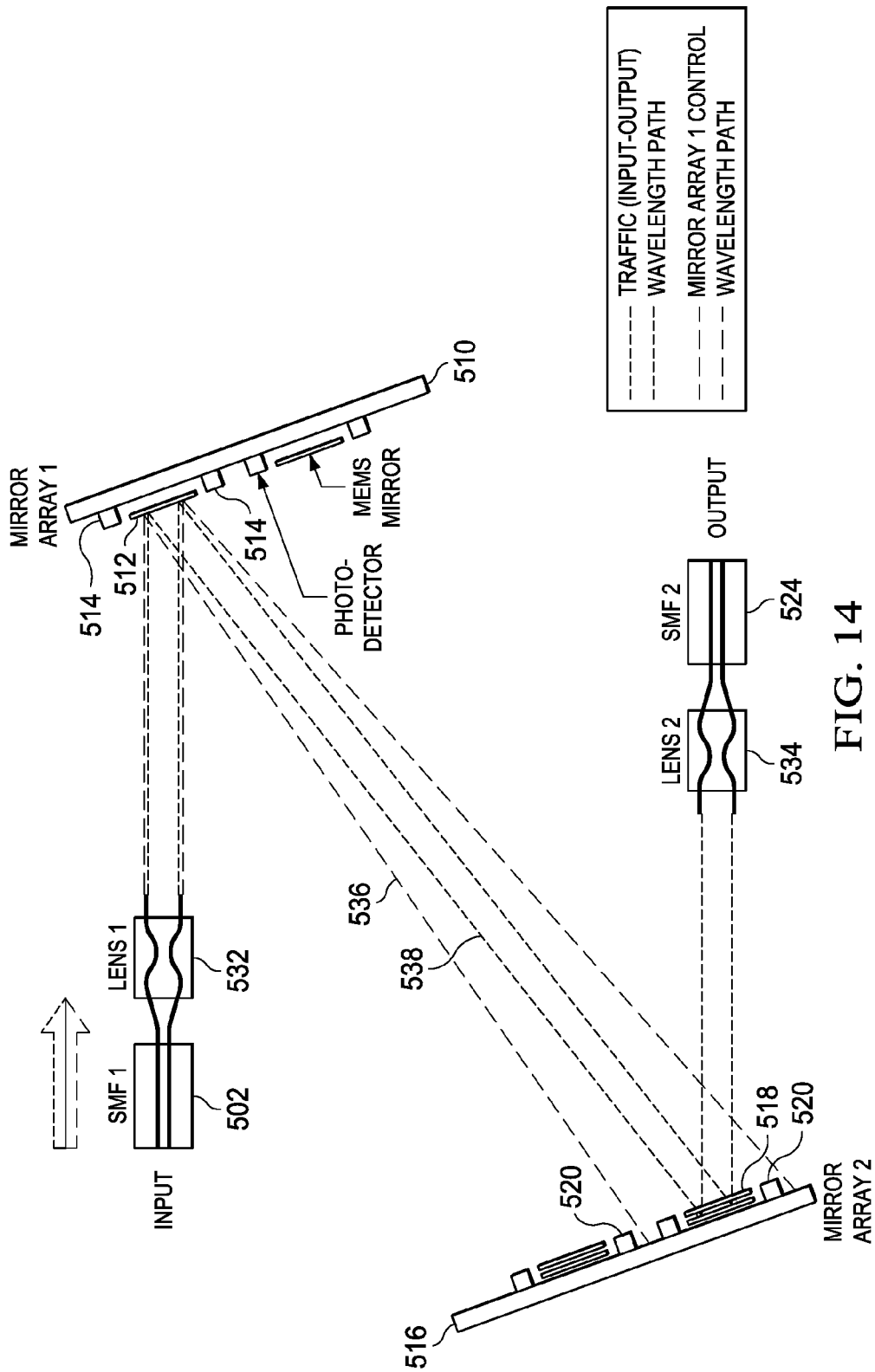
FIG. 14 illustrates an embodiment MEMS module with a longer effective focal length at a control wavelength than at a traffic wavelength.

FIG. 14 illustrates traffic beam 538 and control beam 536 where control beam 536 is slightly divergent. Control beam 536 and traffic beam 538 enter through single mode fiber 502 and lens 532. Lens 532 causes control beam 536 to diverge relative to traffic beam 538, while the beams remain coaxial. Control beam 536 and traffic beam 538 reflect off mirror 512 in mirror array 510 to mirror 518 on mirror array 516. Control beam 536 diverges to illuminate photodiodes 520 when control beam 536 and traffic beam 538 are centered on mirror 518, while traffic beam 538 does not illuminate photodiodes 520 when centered on mirror 518. Control beam 534 and traffic beam 538 then exit through lens 532 to single mode fiber 524. Because of the divergence of control beam 536 in the path to mirror 512, mirror 512 sufficiently large to accommodate the increase in spot size.

Figure 15:
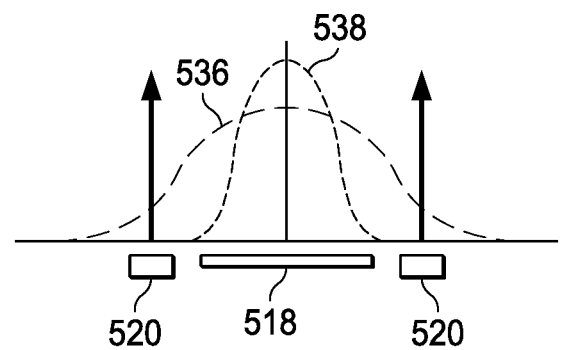
FIG. 15 illustrates a graph of a centered control beam and traffic beam on a MEMS mirror with photodiodes.

The difference in the illumination of photodiodes 520 generates a control vector to steer the beam by adjusting mirror 512 to minimize the differences in the control beam power received on photodiodes 520 associated with mirror 518. When traffic beam 538 and control beam 536 are centered on mirror 518, as illustrated in FIG. 15, the power on the photodiodes is approximately equal, because the traffic beam is coaxial with the control beam. Because the beam spots are coaxial and centered, a similar amount of power is detected by photodiodes 520.

Figure 16:
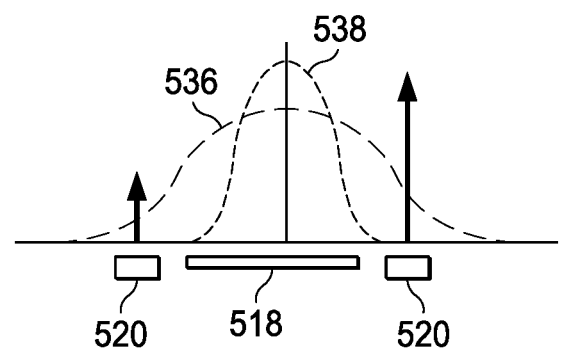
FIG. 16 illustrates a graph of an offset control beam and traffic beam on a MEMS mirror with photodiodes.

FIG. 16 illustrates control beam 536 and traffic beam 538 offset from the center of mirror 518. More light is detected by the right photodiode than by the left photodiode. When three or more diodes are illuminated, the beam location may be determined by triangulation. Because the beams are coaxial, the traffic beam will be aligned when the control beam is aligned.

Because photodiodes 520 are illuminated when traffic beam 538 is centered on mirror 518, the signals generated from photodiodes 520 may control optimization during in-service operation as well as the initial alignment. The photodiodes associated with the target mirror are used for fine alignment, while other photodiodes within a zone of uncertainty are used for initial course alignment. Other mirrors within the zone of uncertainty may be locked during the initial alignment. The mirrors may be locked, for example for 5-10 ms, which is shorter than the time period for locking when precession is used for coarse alignment. Locking is achieved by maintaining the current X, Y drive voltages on the opposing mirrors, irrespective of control input from the target mirror photodiodes surrounding the mirrors within the zone of uncertainty. This frees up the mirror-associated photodiodes within the zone of uncertainty to be used as a detection grid for the new beam location.

Figure 17:
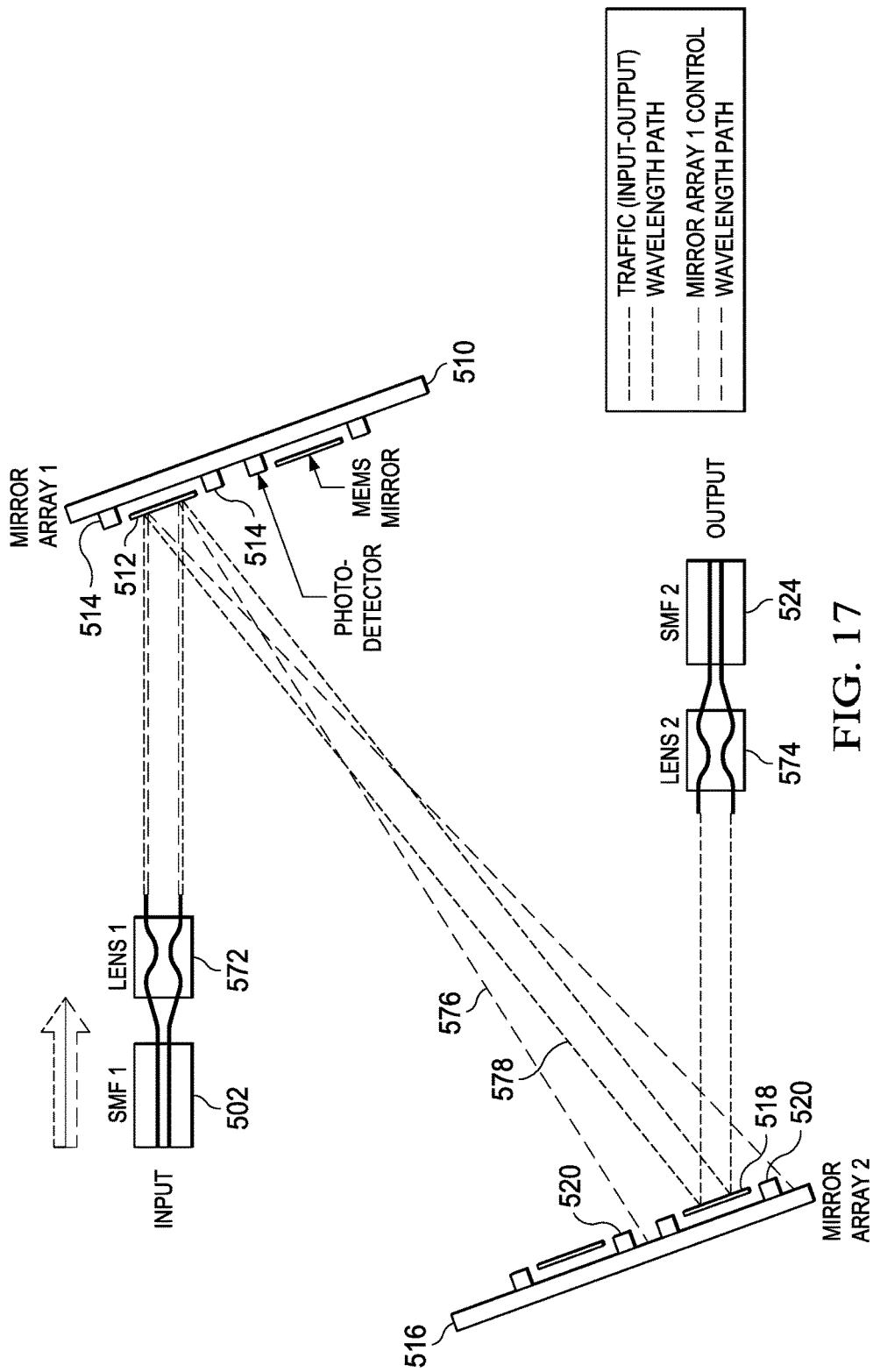
FIG. 17 illustrates another embodiment MEMS module with a shorter effective focal length at a control wavelength than at a traffic wavelength.

FIG. 17 illustrates an optical link where the control beam is slightly convergent and coaxial with the collimated traffic beam. When the focal point is well before the second mirror array, the control beam spreads out beyond the focal point and illuminates the photodiodes surrounding the second mirror. The difference in power detected by the photodiodes around the mirrors can generate a control vector to steer the beam by adjusting the first mirror to minimize the differences in control beam power received by the photodiodes. When the control power on the photodiodes associated with the mirror is equal, the control beam is centered, and hence the traffic beam. Because the traffic beam is coaxial with the control beam, they are both centered with the same alignment. In this example, the mirror diameter does not need to be increased to handle the control beam, because control beam 576 is smaller than traffic beam 578 at mirror array 510.

Traffic beam 578 and control beam 576 enter through single mode fiber 502 and lens 572. Lens 572 converges control beam 576, while traffic beam 578 is collimated. The beams reflect off mirror 512 on mirror array 510 to mirror 518 on mirror array 516. The beams exit through lens 574 and single mode fiber 524.

Because photodiodes 520 are illuminated by control beam 576 when traffic beam 578 is centered on mirror 518, the signals generated from photodiodes 520 may control the optimization during in-service operation as well as the initial set up operation during fine alignment. Photodiodes associated with mirrors across the zone of uncertainty may be used to detect the initial beam placement. If necessary, the mirrors within the zone of uncertainty are locked in position.

Figure 18:
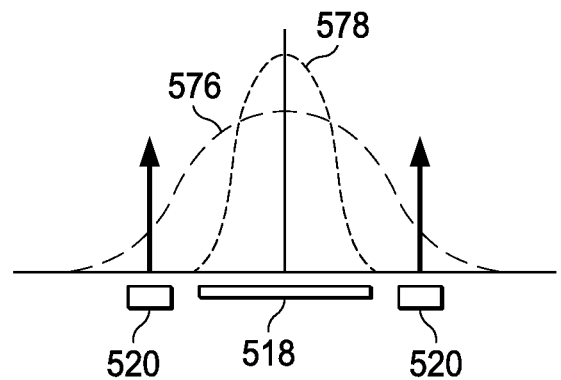
FIG. 18 illustrates a graph of a centered control beam and traffic beam on a MEMS mirror with interstitial photodiodes.

FIG. 18 illustrates traffic beam 578 and control beam 576 centered on mirror 518. Photodiodes 520 detect approximately the same amount of optical power, indicating that control beam 576, and hence traffic beam 578, are centered on mirror 518.

Figure 19:
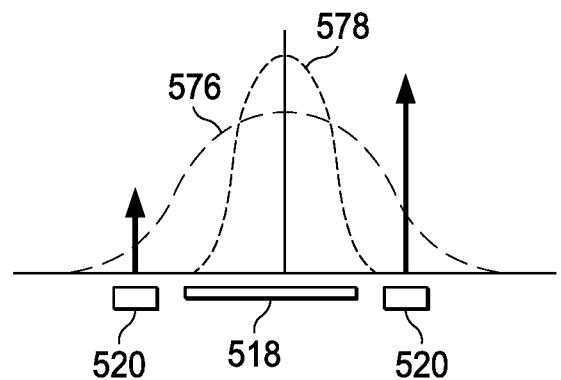
FIG. 19 illustrates a graph of an offset control beam and traffic beam on a MEMS mirror with interstitial photodiodes.

FIG. 19 illustrates traffic beam 578 and control beam 576 offset from the center of mirror 518. More optical power is detected by the right photodiode than by the left photodiode. By using three or more photodiodes around the mirror, the direction and approximate magnitude of the misalignment may be calculated. A correction vector may then be calculated.

Figure 20:
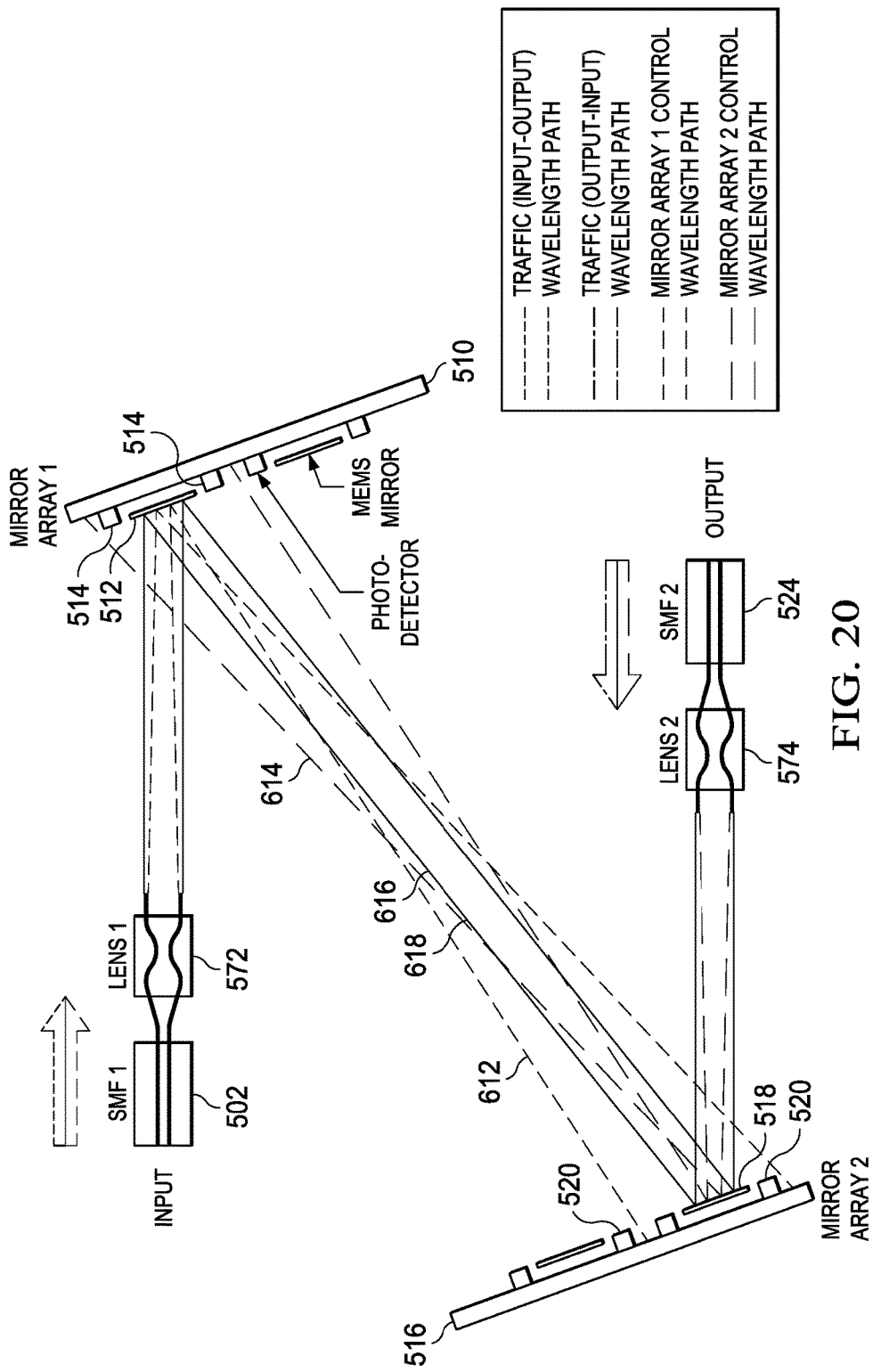
FIG. 20 illustrates an additional embodiment MEMS module with a chromatically variant focal length collimating lens.

FIG. 20 illustrates the bidirectional control of MEMS mirrors with collimators having a shorter focal length at the control wavelength than at the traffic wavelength. The control beams 612 and 614 are slightly convergent but coaxial with the collimated traffic beams 616 and 618.

When the focal points of the convergent control beams occur well before the second mirror array to be encountered along both beam directions, control beams are slightly divergent expanding beams beyond its respective focal points. The control beam equally illuminates the photodiodes around the mirrors on its respective target array when the mirror of the first array it encounters is correctly pointed.

When the control power on the photodiodes associated with a target mirror are approximately equal, the control beam is centered in the forward and reverse path. Because the traffic beams are coaxial with the control beams, the traffic beam is also centered.

Figure 21:
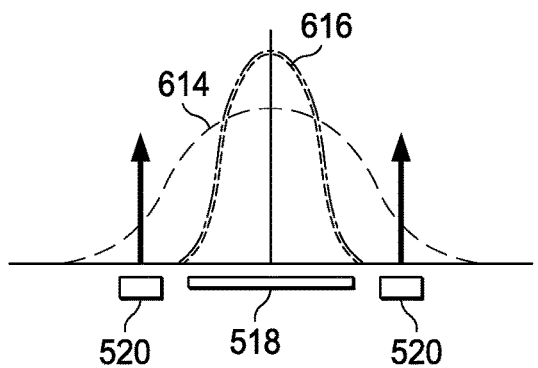
FIG. 21 illustrates a graph of a centered control beam and traffic beam on a MEMS mirror with interstitial photodiodes.

FIG. 21 illustrates when the reverse path control beam and traffic beam are properly aligned. Traffic beam 616 is confined to mirror 518. Control beam 614 evenly illuminates photodiodes 520, which produce the same level of output response.

Figure 22:
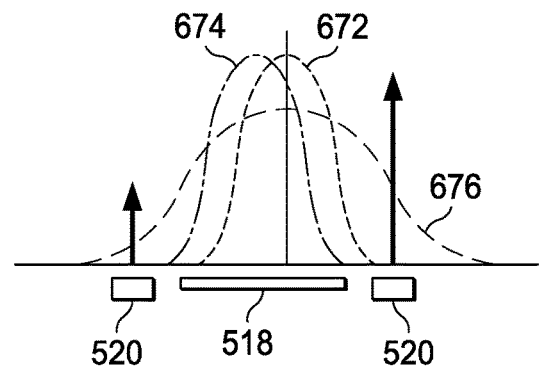
FIG. 22 illustrates a graph of a centered control beam and traffic beam on a MEMS mirror with interstitial photodiodes.

FIG. 22 illustrates a beam distribution where a beam is offset from the center. Traffic beam 672 is offset from the center, and traffic beam 674 is also not centered on the mirror. Control beam 676 is offset, causing a different response from the photodiodes, which allows the computation of a corrective vector.

The collimating lens may be a series of simple lenses, a small component lens, a gradient index (GRIN) lens, or another simple or compound lens. A compound lens is made of two different glasses with differing refractive indices, one with a higher degree of chromatic aberration, and the other with a lower level of chromatic aberration.

Figure 23:
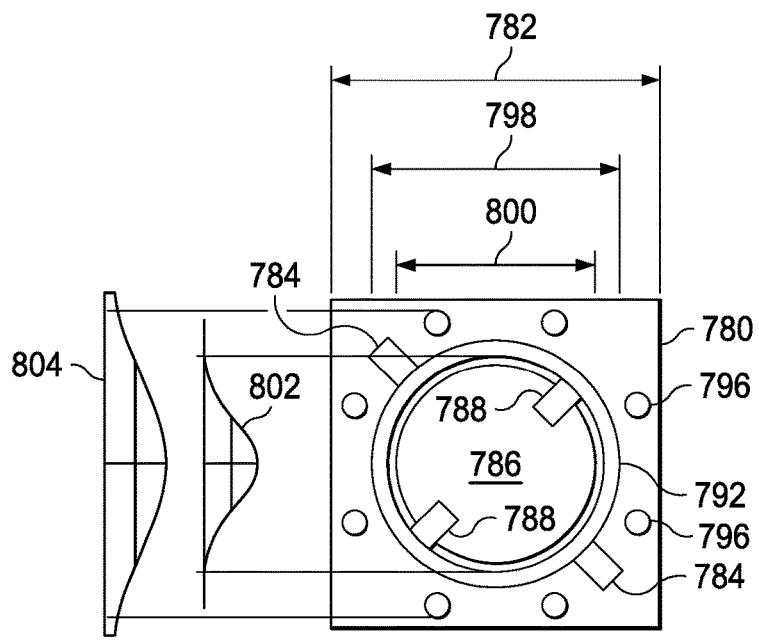
FIG. 23 illustrates an embodiment MEMS mirror cell with interstitial photodiodes.

FIG. 23 illustrates an example of a MEMS cell 780 containing MEMS mirror 786, gimbal 792, electrodes 784 and 788, and photodiodes 796. MEMS mirror 786 has a diameter 800, gimbal 792 has a diameter 798, and MEMS cell 780 has a length 782. The gimbal diameter may be from about 110% to about 115% or more of the mirror diameter, while the cell size may be approximately 145% the diameter of the mirror. Photodiodes 796 are placed around the circumference of mirror 790, for example about a 50 µm from the edge of gimbal 792. Eight photodiodes are pictured, but fewer or more photodiodes may be used. The photodiodes may be, for example, approximately 50 to 100 µm in diameter. Traffic beam 802 has most of its optical power over MEMS mirror 786, while control beam 804 has significant power at the photodiode radius. For example, the traffic beam may have a full width half maximum (FWHM) of about half the mirror diameter. On the other hand, the control beam may have a beam diameter of about 185% to 250% of the traffic beam.

Figure 24:
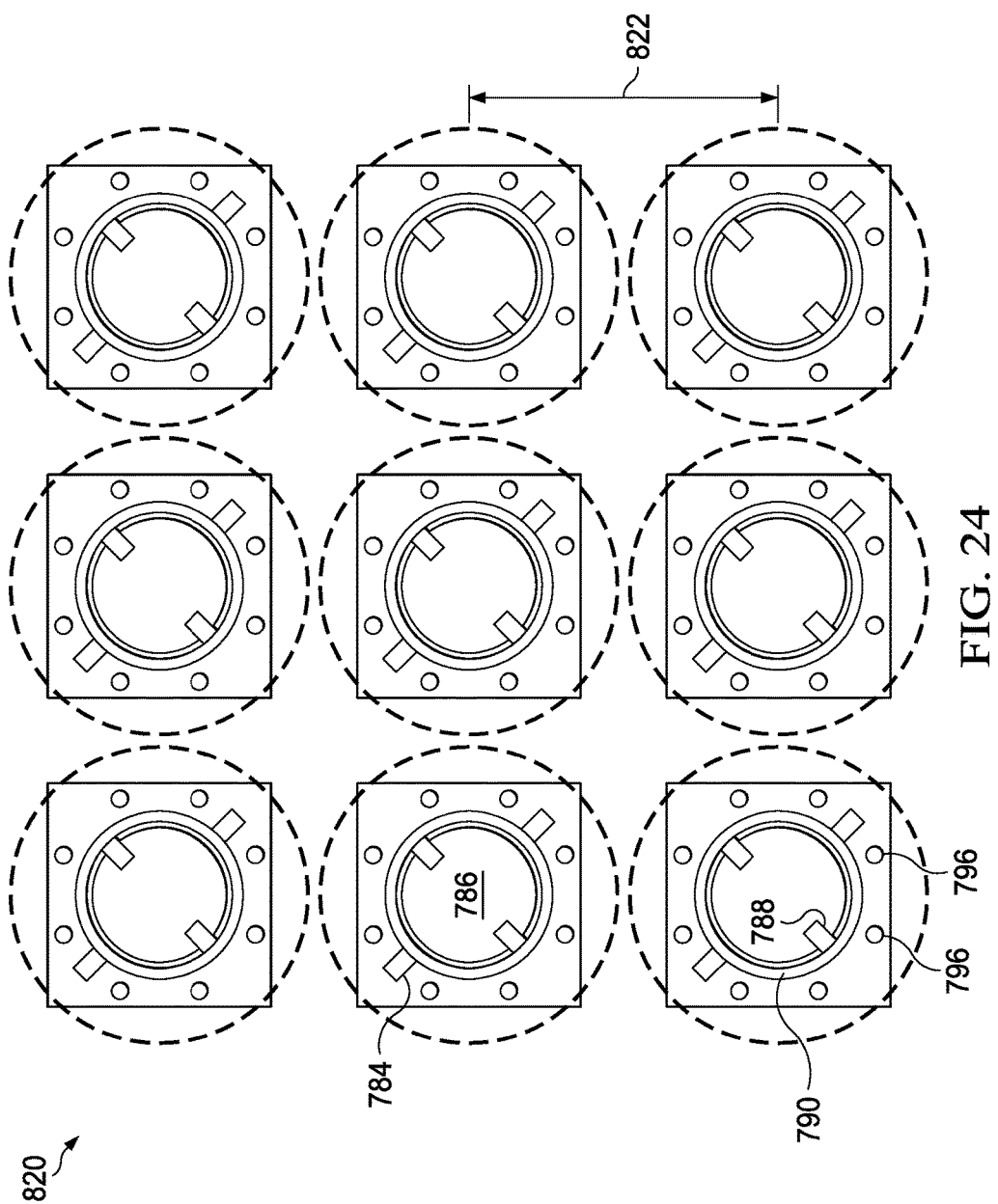
FIG. 24 illustrates an embodiment MEMS mirror array with interstitial photodiodes.

FIG. 24 illustrates square grid of MEMS mirrors 820. The MEMS cells repeat with distance 822, which may be, for example 200% to 300% of the mirror diameter. FIG. 24 shows the result of placing the MEMS cells at 200% (the lower end) of the mirror diameter. In one example, such as an example where the MEMS cell spacing is enlarged from 200% of the mirror diameter, there are additional photodiodes between the mirrors that are not associated with a particular mirror (not pictured). For example, one photodiode may be positioned equidistant from four surrounding mirrors.

Figure 25:
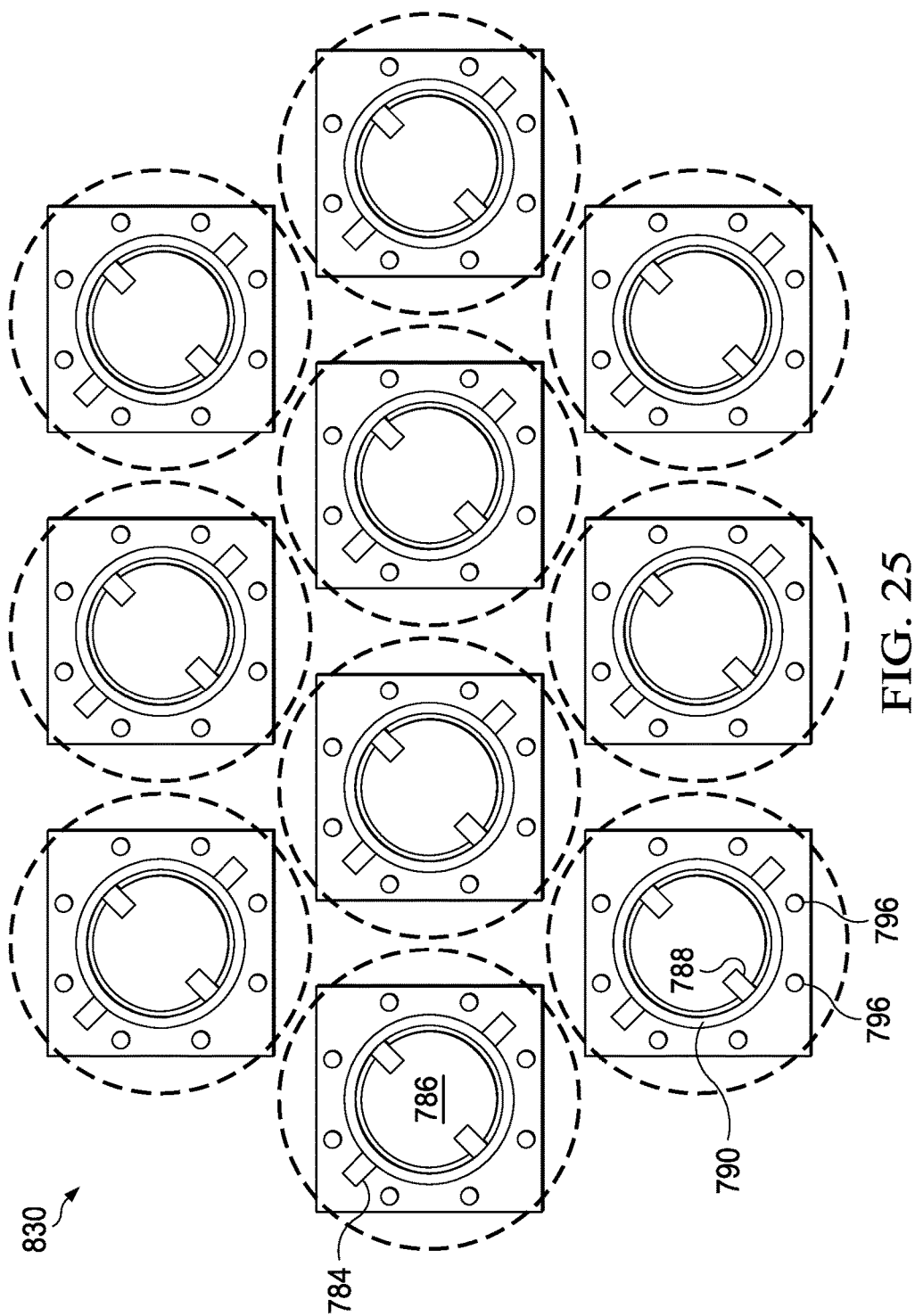
FIG. 25 illustrates another embodiment MEMS mirror array with interstitial photodiodes.

FIG. 25 illustrates triangular grid of MEMS mirrors 830. Mirrors in a triangular grid are more closely packed than in a square grid with the same ratio of mirror diameter to mirror center spacing.

Figure 26:
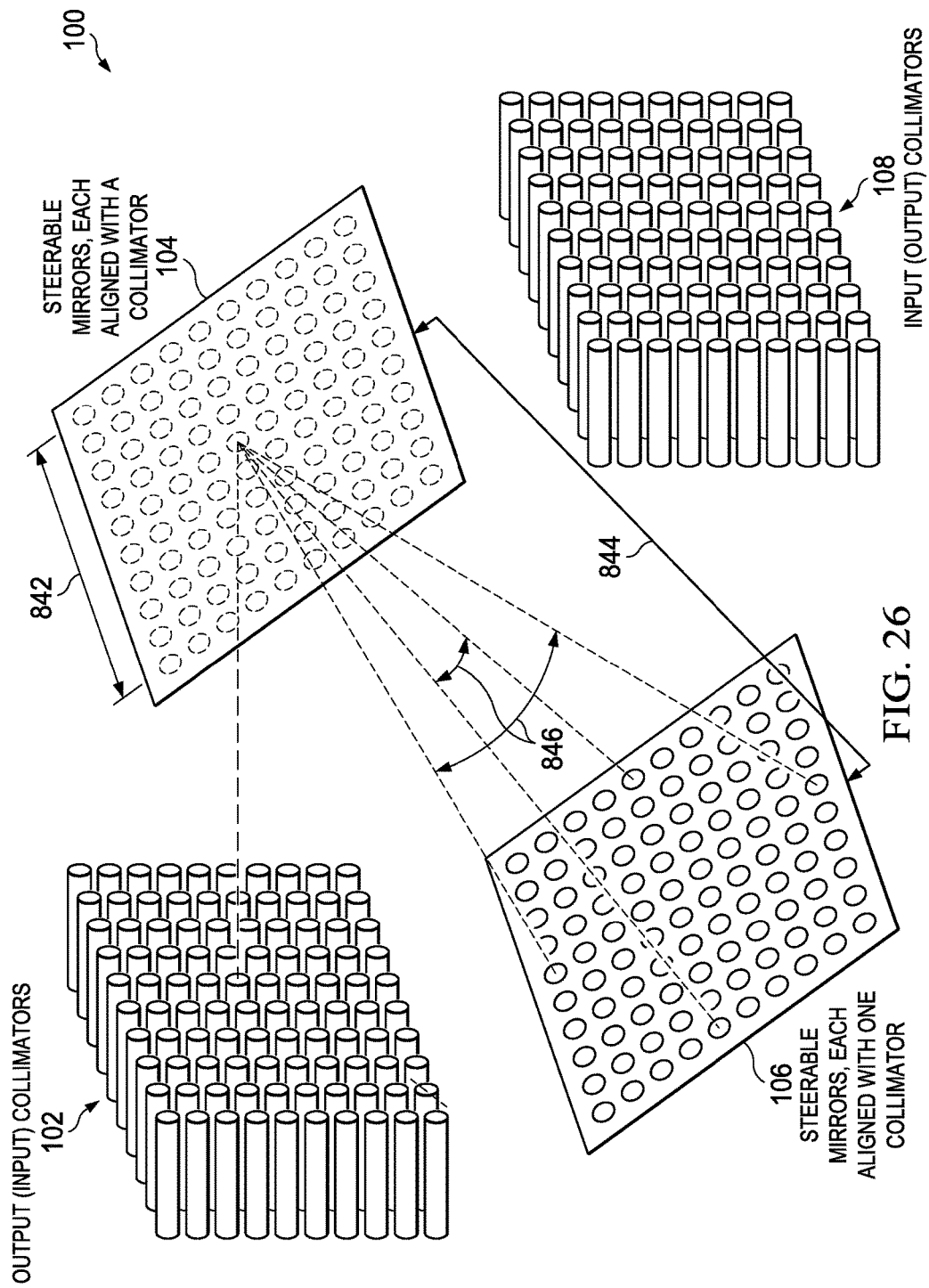
FIG. 26 illustrates an embodiment MEMS module.

FIG. 26 illustrates optical beam propagation between MEMS mirrors. Mirror array 104 has N mirrors and a width 842 of P. Mirror array width 842 is equal to the mirror pitch times the square root of N. In an example, MEMS mirrors have a maximum deflection angle of about 5-7 degrees. Only half of the deflection angle is usable due to parallax. The mirror deflection angle 846 is given by Z, and the spacing between mirror arrays 844 is given by:

$$\frac{P}{\tan(2Z)} = \frac{p\sqrt{N}}{\tan(2Z)}.$$

The control beam expansion occurs from the input collimator to the second mirror, which may be about 1.5 the mirror to mirror distance.

Table 1 below illustrates the mirror spacing based on the maximum angle Z and the number of mirrors N for 1 mm mirrors. Table 2 illustrates the distance between the input collimator and the second mirror for the control beam expansion for 1 mm mirrors. For an example 300×300 switch with 1 mm mirrors, the inter-mirror spacing is 350-495 mm and the path length from the input collimator to the second mirror is from approximately 530 mm to approximately 740 mm depending on the maximum angle Z. Table 3 illustrates the mirror spacing for 0.3 mm mirrors, and Table 4 illustrates the distance between the input collimator and the second mirror for the control beam expansion for 0.3 mm mirrors. For an example 200×200 port switch with 0.3 mm mirrors, the inter-mirror spacing is from approximately 85 mm to approximately 120 mm and the path length from the input collimator to the second mirror is from approximately 130 mm to approximately 180 mm depending on the maximum angle Z.

TABLE 1

| N | Path Length Between Mirrors (mm) - (Z = 5°) | Path Length Between Mirrors (mm) - (Z = 6°) | Path Length Between Mirrors (mm) - (Z = 7°) | Die Size (side - mm) |
|---|---|---|---|---|
| 100 | 285.8 | 237.9 | 203.6 | 27.5 |
| 200 | 404.1 | 336.4 | 288.0 | 37.9 |
| 300 | 495.0 | 412.0 | 352.7 | 45.8 |
| 400 | 571.5 | 475.8 | 407.2 | 52.5 |
| 500 | 639.0 | 531.9 | 455.3 | 58.4 |
| 600 | 700.0 | 582.7 | 498.8 | 63.7 |
| 700 | 756.1 | 629.4 | 538.7 | 68.6 |
| 800 | 808.3 | 672.8 | 575.9 | 73.2 |
| 900 | 857.3 | 713.6 | 610.9 | 77.5 |
| 1000 | 903.7 | 752.2 | 643.9 | 81.6 |

TABLE 2

| N | Path Length Between Input Collimator And 2nd Mirror (mm) - (Z = 5°) | Path Length Between Input Collimator And 2nd Mirror (mm) - (Z = 6°) | Path Length Between Input Collimator And 2nd Mirror (mm) - (Z = 7°) | Die Size (side - mm) |
|---|---|---|---|---|
| 100 | 428.7 | 356.8 | 305.4 | 27.5 |
| 200 | 606.2 | 504.6 | 432.0 | 37.9 |
| 300 | 742.5 | 618.0 | 529.0 | 45.8 |
| 400 | 857.3 | 713.6 | 610.9 | 52.5 |
| 500 | 958.5 | 797.9 | 683.0 | 58.4 |
| 600 | 1050.0 | 874.0 | 748.2 | 63.7 |
| 700 | 1134.1 | 944.0 | 808.1 | 68.6 |
| 800 | 1212.4 | 1009.2 | 863.9 | 73.2 |
| 900 | 1286.0 | 1070.4 | 916.3 | 77.5 |
| 1000 | 1355.5 | 1128.3 | 965.9 | 81.6 |

TABLE 3

| N | Path Length Between Mirrors (mm) - (Z = 5°) | Path Length Between Mirrors (mm) - (Z = 6°) | Path Length Between Mirrors (mm) - (Z = 7°) | Die Size (side - mm) |
|---|---|---|---|---|
| 100 | 85.7 | 71.4 | 61.1 | 8.3 |
| 200 | 121.2 | 100.9 | 86.4 | 11.4 |
| 300 | 148.5 | 123.6 | 105.8 | 13.7 |
| 400 | 171.5 | 142.7 | 122.2 | 15.8 |
| 500 | 191.7 | 159.6 | 136.6 | 17.5 |
| 600 | 210.0 | 174.8 | 149.6 | 19.1 |
| 700 | 226.8 | 188.8 | 161.6 | 20.6 |
| 800 | 242.5 | 201.8 | 172.8 | 22.0 |
| 900 | 257.2 | 214.1 | 183.3 | 23.3 |
| 1000 | 271.1 | 225.7 | 193.2 | 24.5 |

TABLE 4

| N | Path Length Between Input Collimator And 2nd Mirror (mm) - (Z = 5°) | Path Length Between Input Collimator And 2nd Mirror (mm) - (Z = 6°) | Path Length Between Input Collimator And 2nd Mirror (mm) - (Z = 7°) | Die Size (side - mm) |
|---|---|---|---|---|
| 100 | 128.6 | 107.0 | 91.6 | 8.3 |
| 200 | 181.9 | 151.4 | 129.6 | 11.4 |
| 300 | 222.7 | 185.4 | 158.7 | 13.7 |
| 400 | 257.2 | 214.1 | 183.3 | 15.8 |
| 500 | 287.6 | 239.4 | 204.9 | 17.5 |
| 600 | 315.0 | 262.2 | 224.4 | 19.1 |
| 700 | 340.2 | 283.2 | 242.4 | 20.6 |
| 800 | 363.7 | 302.8 | 259.2 | 22.0 |
| 900 | 385.8 | 321.1 | 274.9 | 23.3 |
| 1000 | 406.7 | 338.5 | 289.8 | 24.5 |

Figure 27:
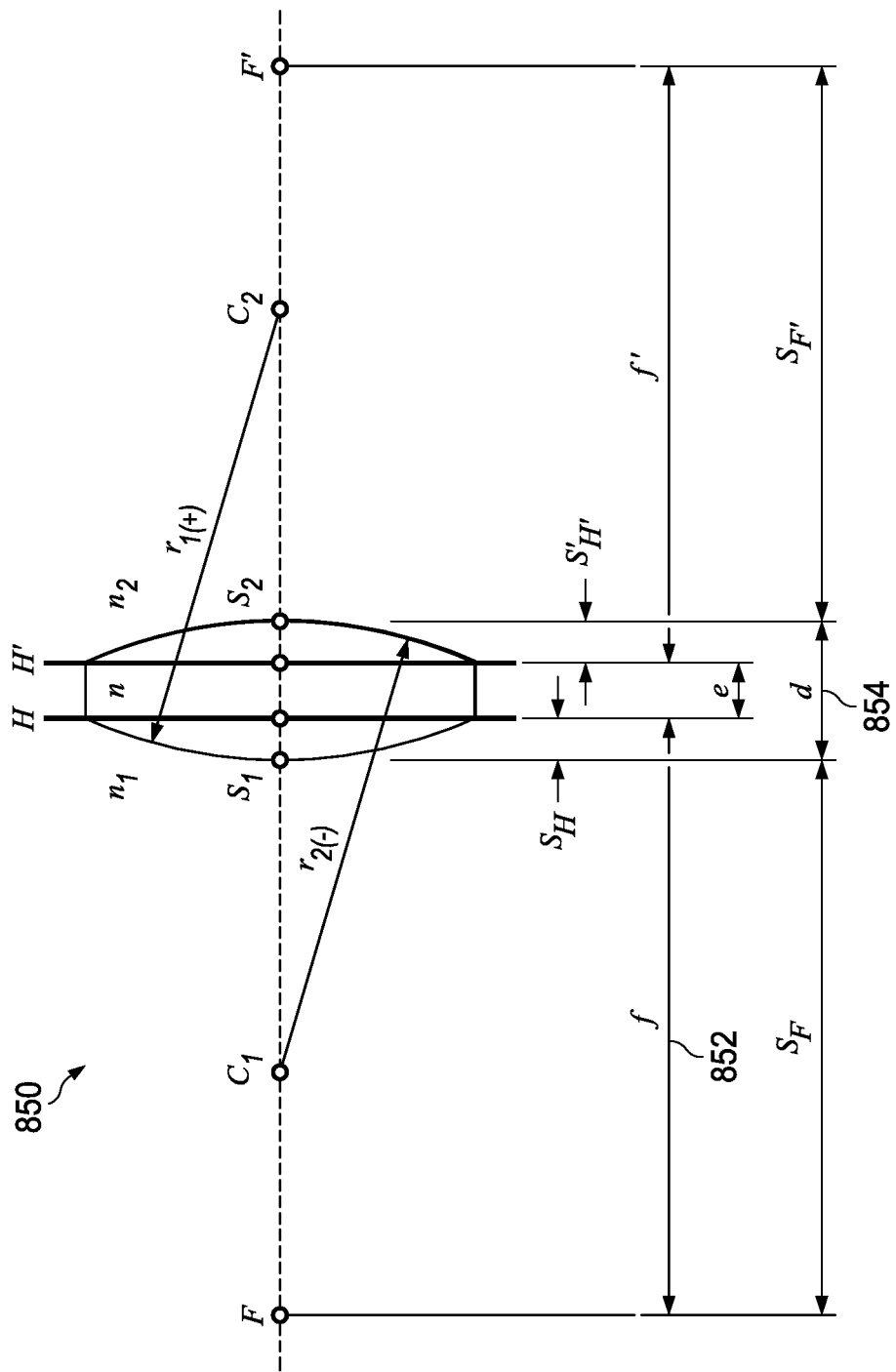
FIG. 27 illustrates an embodiment lens.

FIG. 27 illustrates lens 850 which may be used as a collimator in a MEMS photonic switch. Lens 850 has a thickness 854 of d and a focal length 852. For a lens with a thickness d in air, and surfaces with radii of curvature R1 and R2, the effective focal length f is given by:

$$\frac{1}{f} = (n-1)\left(\frac{1}{R_1} - \frac{1}{R_2} + \frac{(n-1)d}{nR_1R_2}\right),$$

where n is the refractive index of the lens medium. The effective focal length of the lens is more than proportional to the reciprocal of the refractive index minus 1. Hence, for a glass with a refractive index of 1.5, a change to a refractive index of 1.51 creates a more than 2% shortening of the focal length. For a 300×300 MEMS switch using 1 mm mirrors with a path length from the input collimator to the second mirror of 650 mm, the focal point of the control beam from the collimator is placed at less than 650/3 mm to facilitate 2:1 expansion beyond the focal point. Assuming that, for a 1 mm beam diameter a focal length of less than 6 mm is used for the traffic beam, the focal length of the control beam can be calculated by 1/u+1/v=1/f, where v is the distance from the collimator to the first mirror and v is the focal length of the traffic beam. Where u=5 mm and v=650/3 mm, the focal length of the control beam is 5.877, a change of 2.26%. For a glass with a refractive index of 1.5, this involves a change in refractive index to 1.512.

Table 5 below illustrates the figure of merit for various glasses. The figure of merit is based on the difference in focal length at 1.55 μm and 800 nm. A high refractive index glass facilitates a short focal length lens. For example, K-SLD-10 (Sumita) glass may be used for a lens.

TABLE 5

| Type | Refractive Index @ 1.55 u | Refractive Index @ 0.8 u | Percentage change in RI | Figure of merit (percentage change in focal length) |
|---|---|---|---|---|
| K-SFLD-11 (Sumita) | 1.74324 | 1.76482 | 1.24 | 2.675 |
| E-FD-10 (Hoya) | 1.69212 | 1.71115 | 1.125 | 2.537 |
| N-SF5 (schott) | 1.64217 | 1.65863 | 1.002 | 2.37 |
| E-BAK-1 (Hikari) | 1.55198 | 1.56526 | 0.856 | 2.233 |
| LASF9 | 1.8133 | 1.83248 | 1.058 | 2.17 |
| Fused Silica | 1.44402 | 1.45332 | 0.644 | 1.957 |
| S-BAH-10 (Ohara) | 1.64695 | 1.66002 | 0.793 | 1.933 |
| SiO2 | 1.5277 | 1.53834 | 0.696 | 1.874 |
| N-BAF-10 (schott) | 1.64687 | 1.6599 | 0.797 | 1.862 |
| E-BK-7 (Hikari) | 1.50086 | 1.51078 | 0.661 | 1.844 |
| S-BAL-11 (Ohara) | 1.55462 | 1.56529 | 0.686 | 1.786 |
| Fused Germania | 1.5871 | 1.59837 | 0.71 | 1.779 |
| Al2O3 | 1.746 | 1.75987 | 0.792 | 1.773 |
| FK51A | 1.47594 | 1.48231 | 0.431 | 1.248 |

Figure 28:
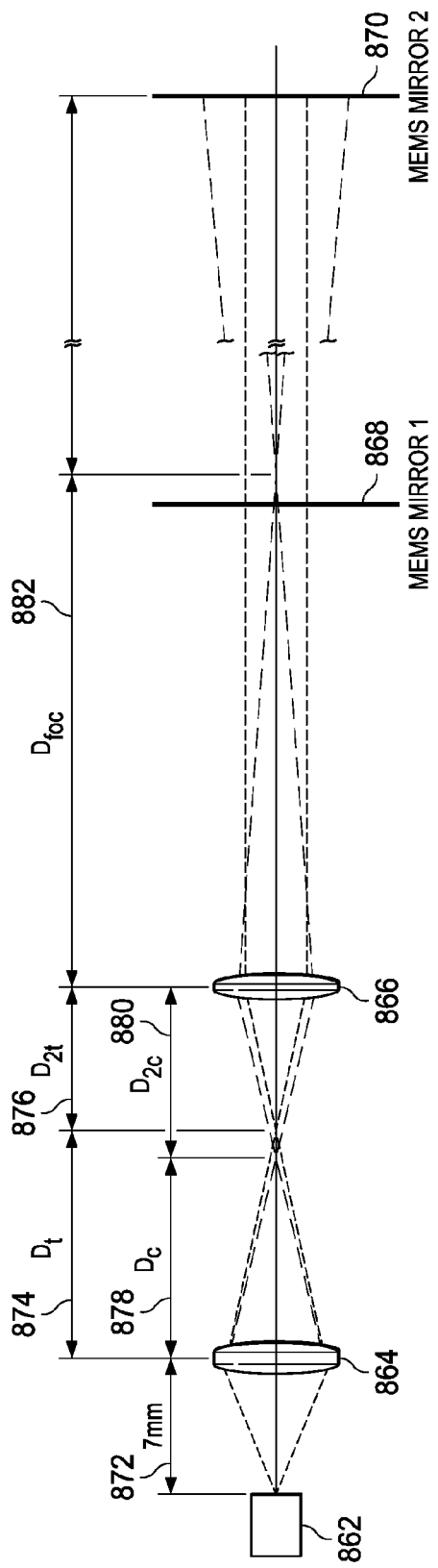
FIG. 28 illustrates a ray trace model for an embodiment compound lens.

FIG. 28 illustrates a ray trace model for a compound lens design. Fiber 862 is distance 872, for example 7 mm, from lens 864. In an example, lens 864 has a 5 mm focal length at the traffic wavelength of 1550 nm and a 4.95 mm focal length at the control wavelength of 890 nm. The lens diameter for lens 864 is approximately 140% of the final beam diameter. Lens 866 has a focal length at the traffic wavelength of 5 mm and at the control wavelength of 4.95 mm. Light is reflected on MEMS mirror 868 and MEMS mirror 870. Distance 874, $D_t$, for the traffic wavelength is given by:

$$D_t = \frac{1}{\frac{1}{f} - \frac{1}{u}} = 17.5 \text{ mm.}$$

The distance 878, $D_c$, for the control wavelength is given by:

$$D_c = \frac{1}{\frac{1}{f} - \frac{1}{u}} = 16.902 \text{ mm.}$$

Length 876, $D_{2t}$, is the focal length of lens 866 at the traffic wavelength which is 5 mm. Length 880, $D_{2c}$, is given by 5+(17.5−16.902)=5.598 mm. Then, distance 882, $D_{foc}$, is given by:

$$D_{foc} = \frac{1}{\frac{1}{f} - \frac{1}{u}} = 25.24 \text{ mm.}$$

For a thin lens in a medium with a refractive index of 1, where n is the refractive index of the lens, and $R_1$ and $R_2$ are the curvatures of the two faces of the lens, the focal length may be approximately found by:

$$\frac{1}{f} = (1-n)\left(\frac{1}{R_1} - \frac{1}{R_2}\right).$$

A vacuum, air, and nitrogen all have a refractive index of approximately 1.

A single lens with high dispersion may be used as a collimator in a MEMS photonic switch. For example, L-BBHA glass may be used. For an example single lens, $R_1$ is 9.23 mm and $R_2$ is infinity. Then, n is 2.047, and f is 8.882 mm at 980 mm, an example control wavelength. At 1550 nm, an example, traffic wavelength, n is 2.025, and f is 9.00 mm.

A two lens example collimator may use glass with a somewhat lower chromatic dispersion, for example quartz or pure silica, to achieve the same focal length changes with wavelength. Both lenses are made of the same material. In an example, the traffic wavelength is 1550 nm and the control wavelength is 980 nm. The lens closer to the fiber has an $R_1$ of 1.58 mm and an $R_2$ of infinity. At 980 nm, n is 1.535 and f is 2.96 mm, while at 1550 nm n is 1.528 and f is 3.00 mm. For the lens farther from the fiber, $R_1$ is 6.97 mm and $R_2$ is infinity. For this lens, at 980 nm, n is 1.535 and f is 13.03 mm, and at 1550 nm, n is 1.528 and f is 13.20 mm.

Figure 29:
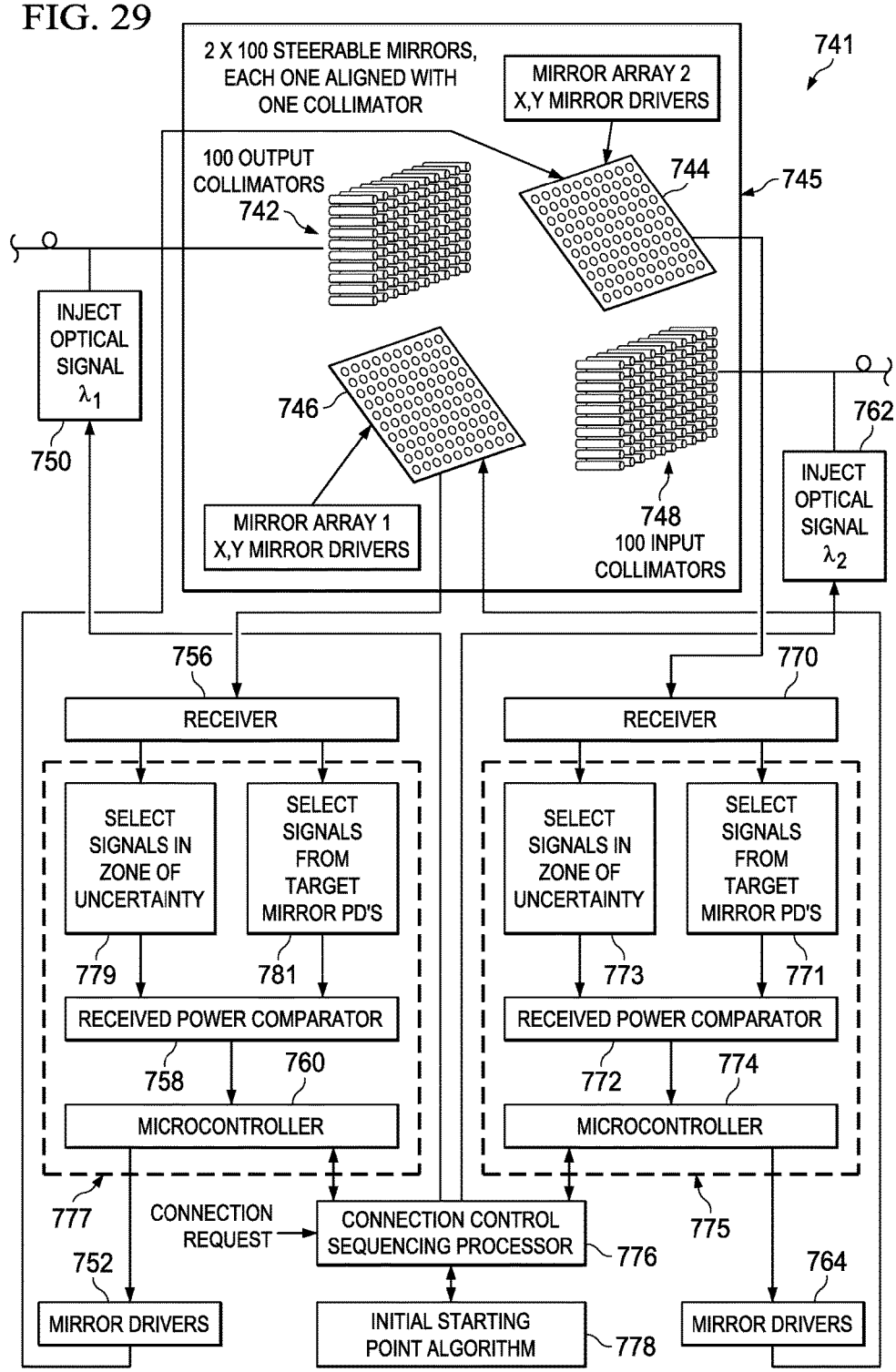
FIG. 29 illustrates an embodiment control system for a MEMS mirror array with interstitial photodiodes and an expanded control beam.

FIG. 29 illustrates control system 741 to control a MEMS photonic switch with interstitial photodiodes and an expanded control beam. In control system 741 the initial connection process involves the mirrors aimed into the zone of uncertainty being briefly locked at their current positions for the duration of the initial beam acquisition, so the photodiodes within the zone of uncertainty may be used to determine the landing site of the new beam without disturbing the in-service mirror settings.

MEMS module 745 contains collimator array 742, the collimators of which aligned to the mirrors of mirror array 744, and mirror array 746, the mirrors of which are aligned to the collimators of collimator array 748. Mirror arrays 744 and 746 contain MEMS mirrors surrounded by interstitial photodiodes. An out-of-band control optical carrier is injected in the ports using expanding beams from the collimators. The control light is injected from inject optical signal block 750 and inject optical signal block 762, by connection control sequencing processor 776. Control system 741 uses the responses from the photodiodes to achieve acquisition and optimization of the segments of overall optical paths through the MEMS photonic switch.

Connection control sequencing processor 776 receives a connection request, for example in the form of an input port to an output port. Then, connection control sequencing processor 776 determines the row and column of a particular mirror on mirror array 744 and to be connected to a target mirror on mirror array 746. Next, connection control sequencing processor 776 establishes the appropriate initial drive voltages for those mirrors to reflect incoming control beams from their respective collimators on to or nearby the opposing target mirror. The initial beam placement may be within the zone of uncertainty around the target mirror where the beam may initially land. The zone of uncertainty arises from the tolerances in the calculation process and variations in mirror deflection sensitivity. For the initial beam placement, a pre-measured lookup table may be used.

In another example, connection control sequencing processor 776 uses an algorithmic approach for the initial beam placement from initial starting point algorithm 778, which determines the appropriate drive voltages by calculating the mirror pointing angles in the X and Y planes from the geometry of the mirror chamber. Then, from the average drive voltage/deflection characteristics of the mirror cells, initial starting point algorithm 778 computes the drive voltages. Because the average deflection characteristics are used, and not a mirror-cell specific characteristic, there is no large drive-voltage table. However, there is a significant initial pointing error for the tolerances on the geometry and drive voltage deflection characteristics, which differ from mirror to mirror across a mirror array and between batches of mirror arrays. In a MEMS switch with interstitial photodiodes that directly detect the beam landing site, the initial coarse correction can be performed rapidly, making a large zone of uncertainty reasonable. The acquisition time may be about 5-10 ms, mostly for ramping the drive voltages slowly to avoid triggering the MEMS mirror sprung mass resonance due to rapidly changing the mirror position. The initial pointing error may be reduced by making one measurement per array during production testing or field commissioning to generate the x and y drive voltages for one specific mirror on an array to link one specific mirror on one array to a particular mirror on the opposing array. This provides some calibration based on the mirror batch process variations without requiring a long complex measurement process.

Initial starting point algorithm 778 provides the initial pointing to connection control sequencing processor 776. Connection control sequencing processor 776 then computes the approximate initial drive voltages. The initial drive voltages are passed to microcontroller 760 of block, 777 or microcontroller 774 of block 775. Then, driver 752 drives the mirrors on mirror array 744 or driver 764 drives mirror array 746.

The responses from the photodiodes of the opposing mirror array, mirror array 746 or mirror array 744, are received by receiver 756 or receiver 770. In an example, receiver 756 and receiver 770 are electronic amplifiers for the photodiode electrical response to the incident light.

Then, signals from within in the zone of uncertainty are selected in block 779 or block 773. The number of photodiodes in the zone of uncertainty may be much smaller than the total number of photodiodes on the mirror array. For example, the zone of uncertainty may include photodiodes around mirrors within one to three mirror pitches of the target mirror.

The responses of the photodiodes within the zone of uncertainty are searched to locate the beam landing spot. The responses are determined by received power comparator 758 and received power comparator 772. The photodiode with the largest response may be approximately the location of the control beam landing spot. If three or more photodiodes have a response, the position of the beam landing spot may be accurately determined using triangulation. Because the control beam may impinge upon photodiodes of mirrors other than the target mirror, the control interference with established optical paths may be managed. In one example, the photodiodes to in-service mirrors within the zone of uncertainty are locked by locking the current values of their drive voltages. The photodiodes are thereby freed to detect the additional light from the new control beam, which may be detected as a delta of their prior illumination from their in-service control beam. The in-service control beam and any transport beam present remains in place, because the opposing mirrors are locked. The mirrors may be locked for approximately 5-10 ms, which is many orders of magnitude shorter than MEMS drift rates (days to years) unless an external event such as a shock impact is applied to the system during that 5-10 ms.

Microcontroller 760 or 774 then determines a correction vector from the location detected of the beam landing spot. The correction vector may be approximate or more exact when triangulation is used.

Next, the opposing mirrors within the zone of uncertainty are unlocked, if they were previously locked. The photodiode responses are received by receiver 756 or 770, and signals from the photodiodes around the target mirror are selected in block 781 or 771. Based on which photodiodes show the greatest responses, or the response difference of the photodiodes and the beam cross-sectional intensity, a fine correction vector is calculated to correct the centering of the control beam, and hence the traffic beam, on the target mirror. The beams are centered on the target mirror when an approximately equal power response is produced from the photodiodes associated with the target mirror. Once this is completed the connection is made.

The fine adjustment may be periodically or continuously performed during operation to maintain alignment. When the beams are properly aligned on the target mirror, the interstitial photodiodes associated with the target mirror remain equally illuminated by the control beam. Detection of uneven illumination indicates a beam positional error than may then be rapidly corrected.

A system that uses interstitial photodiode arrays does not need a precise initial pointing algorithm, and may use a simple approximate algorithm to provide initial pointing. This may be done with no history, no large table, and no expensive, time consuming initial calibration. The initial approximate drive voltages may be ascertained from the average deflection/voltage characteristics of the mirror cell design.

In another example, blocks 779, 781, 773, and 771 are not present. In this embodiment, the initial pointing calculation or determination is sufficiently accurate, so that at least one photodiodes associated with the target mirror is initially illuminated. Thus, only photodiodes associated with the target mirror are examined, and mirrors aimed into the zone of uncertainty which encompasses immediate neighbor mirrors are locked.

Figure 30:
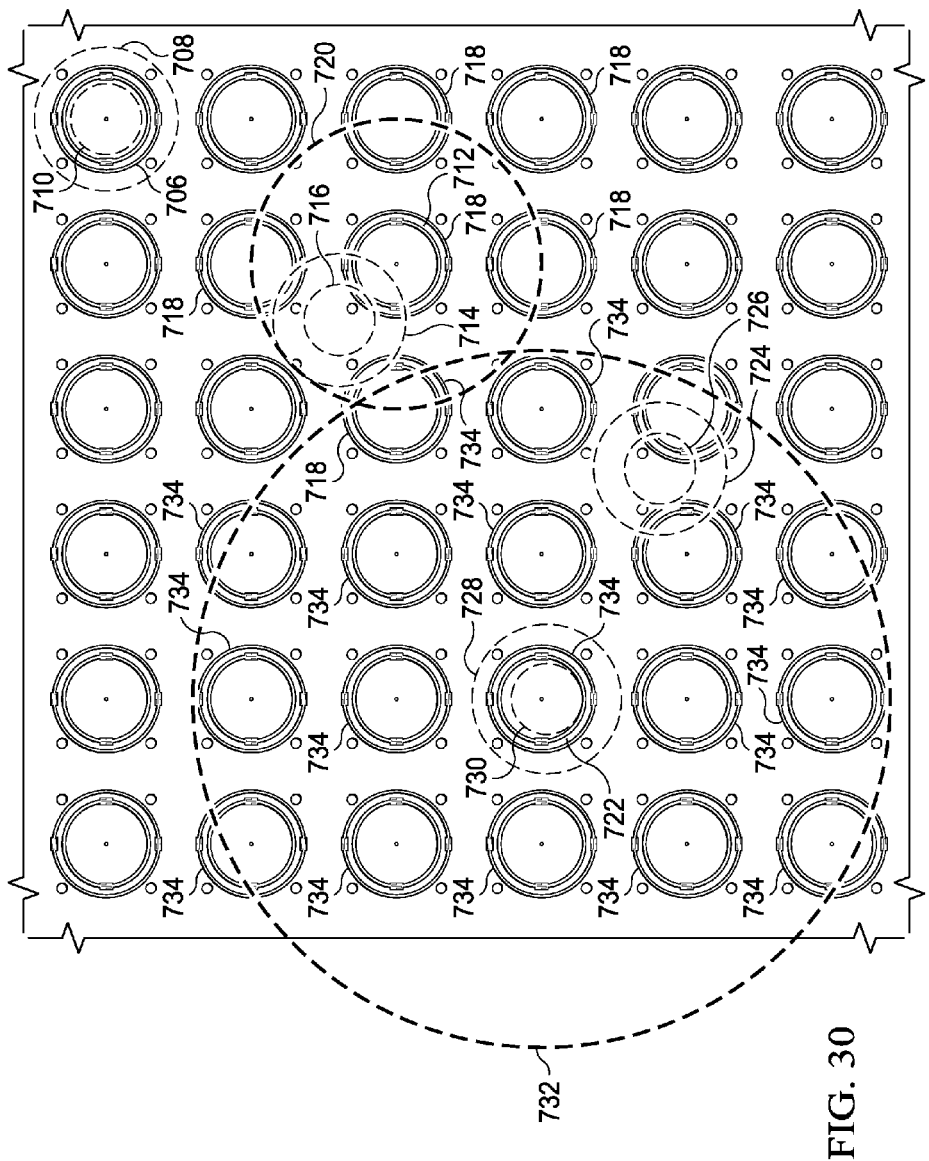
FIG. 30 illustrates optical beam spots on an embodiment MEMS mirror array with interstitial photodiodes and an expanded control beam.

FIG. 30 illustrates a mirror array with some examples of beam landing spots. Traffic beam 710 and control beam 708 are properly aligned on mirror 706. This alignment is unlikely to occur from the initial calculation, due to its approximate nature, but represents the goal for after the acquisition and optimization process has been applied.

In one example, control beam 714 partially illuminates the target mirror, mirror 712. Traffic beam 716 is coaxial with control beam 714. The location of control beam 714, and hence traffic beam 716, can be determined by the light detected by photodiodes within zone of uncertainty 720. Mirrors 718 within zone of uncertainty 720 are locked. The photodiodes illuminated and the relative amount of power detected enables the calculation of a correction vector to be calculated in terms of distance and angle to center the beam on mirror 712. In this example, the beam primarily falls on photodiodes to the left of and above mirror 712, with the most power falling on the photodiode closest to the mirror. Three photodiodes are illuminated. The information from these photodiodes leads to the determination that the beam landing site should be moved to the right and down as a vector angle, and that it needs to be moved about a beam diameter to be better aligned with the target mirror. This calculation can be based on the photodiode that receives the most light, where the vector is approximately from that photodiode's location to the center of the target mirror. In another example, the power received by all three illuminated photodiodes is used to more accurately determine the center of the beam by triangulation. When multiple photodiodes are used, the alignment is performed in a single cycle. Then, during operation, the optimization is maintained against mirror drift by monitoring the photodiodes around the mirror. When fewer than three photodiodes are used, the beam is more accurately centered using the photodiodes associated with mirror 712 as an additional step.

In an example with a broader tolerance for the initial beam pointing, control beam 724 and traffic beam 726 initially land further away from mirror 722, within zone of uncertainty 732. Mirrors 734 within zone of uncertainty 732 are locked during the initial alignment. The photodiodes in the area where the beam landed respond to the received control illumination. The detected illumination values are used to calculate the center of the beam landing site, either approximately using the photodiode that receives the most light or, more accurately using three or more photodiodes to determine the actual location of the center of the beam. A correction vector may be calculated to achieve approximate or accurate alignment with the target mirror. This should bring the beam close to being aligned. For example, traffic beam 730 and control beam 728 are close to being aligned with mirror 722. If an error remains that is detectable among the photodiodes around mirror 722, a second small correction vector may be calculated.

Figure 31:
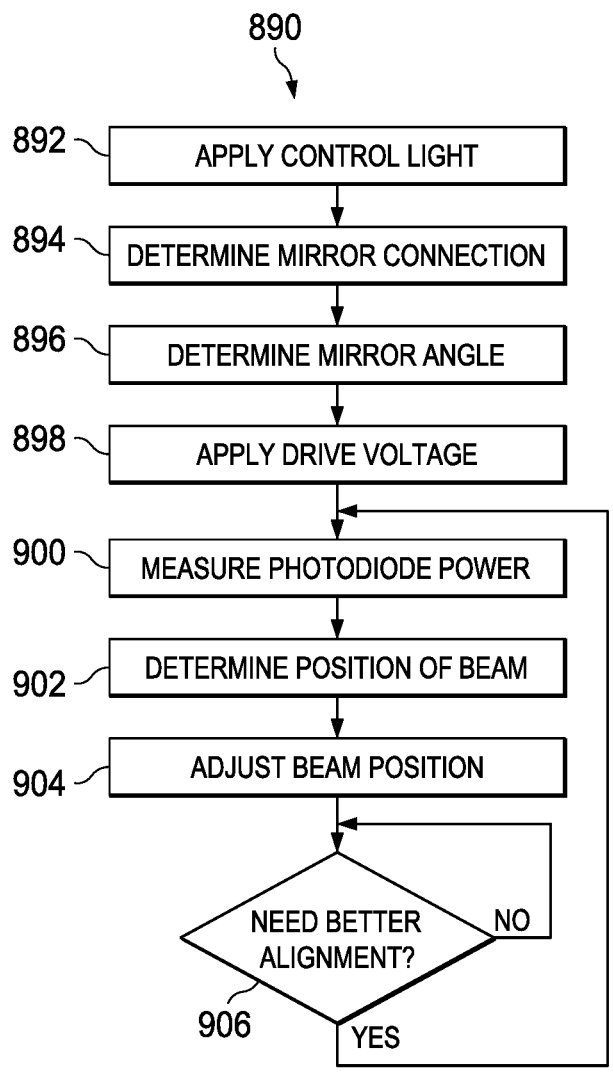
FIG. 31 illustrates a flowchart of an embodiment method for controlling a MEMS mirror array with interstitial photodiodes and an expanded control beam.

FIG. 31 illustrates flowchart 890 for a method of aligning mirrors in a MEMS photonic switch with interstitial photodiodes and an expanded control beam. Flowchart 890 demonstrates a method for aligning a single mirror of a mirror pair on opposing mirror arrays. However, the illustrated method may be performed simultaneously on opposing mirrors to be aligned. Initially, in step 892, a control optical signal is applied. The wavelength of the control optical signal is different than the wavelength of the traffic optical signal, so the wavelengths may be distinguished. For example, the traffic optical signal is in the 1550 nm or 1300 nm communications band, while the control optical signal is in the 800-850 nm or 905-1040 nm range. The control beam is expanded relative to a traffic beam, so the control beam has a larger spot size on the second mirror it encounters.

In step 894, a connection between opposing mirrors on opposing mirror arrays is determined. The mirror connection completes a path from the input collimator to the mirror on a mirror array, to mirror on the opposing mirror array, to an output collimator. Once a connection is aligned, it is available for traffic propagation in both directions.

Then, in step 896, the initial mirror angle is determined. In one example, the initial angle is computed based on the geometry of the mirror arrays. In another example, the initial angle is based on values in a simple a look-up table. For example, the look-up table is based on calculations based on the rows and columns of the mirrors.

Next, in step 898, a drive voltage is applied to initially align the mirror. The drive voltage is based on the mirror angle determined in step 896.

In step 900, the optical power received by photodiodes is measured. During the initial beam pointing, photodiodes within a zone of uncertainty of the target mirror are measured. The zone of uncertainty is determined based on the maximum error in the initial alignment. When the initial beam pointing is accurate, or when an initial alignment has already been performed, only photodiodes associated with the target mirror are used to measure the incoming optical power.

The position of the beam landing spot is determined in step 902 based on the photodiode response in step 900. In one example, the optical power of the beam is most strongly detected by one illuminated photodiode. The beam position may be approximately determined to be at that photodiode. In another example, three or four photodiodes are illuminated by the control beam. The center of the beam may then be determined by triangulation.

Next, in step 904, the beam landing spot is adjusted, for example by using a vector from the determined center of the beam landing spot from step 902 to the center of the target mirror. The drive voltage is adjusted to move the beam by this vector.

Then, in step 906, it is determined if additional alignment is necessary. This may be the case, for example, when only one photodiode is used for the initial alignment. Another iteration may also be necessary when the photodiodes associated with the target mirror are determined to be unevenly illuminated. The associated photodiodes may be periodically examined to maintain alignment. When the alignment is not sufficient, the system proceeds to step 900, where the photodiode power is again measured. The system may periodically monitor the alignment, for example by proceeding to step 900.

The optical control beam may have a relatively low optical power. If a p-type intrinsic n-type (PIN) photodiode receiver and a control optical bandwidth of 100 kHz is used, with an optical beam width of 1 mm and a photodiode effective diameter of 25 µm, the minimum optical beam power for the control signal is 18 dBm.

Aligning MEMS mirror pairs using fine precession and/or coarse precession takes several tens of milliseconds for alignment. The time is affected by many factors, such as mirror mass, gimbal torsion spring strength, the resonant frequency, the damping factor of the resonance, the size of the zone of uncertainty, the maximum usable precession frequency, and the pass-band bandwidth of the filtering for that frequency. Table 6, below, illustrates an example of the time for aligning mirrors using fine precession and coarse precession for an array of MEMS mirrors with a specific set of mirror mechanical properties, including mirror mass-torsion spring resonant frequencies.

TABLE 6

| Action | Time |
| --- | --- |
| Interpret set up request, determine mirror pairing, access look-up table, and determine initial voltage values | <50 µs |
| Ramp voltage to mirrors to avoid overshoot | 1.5 ms |
| Determine if initial optical path is connected | <50 µs |
| Apply coarse precession at 1 kHz and 800 Hz | 37.5 ms |
| Measure phase and amplitude of precession envelope, compute and apply correction | 16.5 ms |
| Determine whether optical path is corrected after coarse precession | <50 µs |
| Apply fine precession at 1 kHz to one mirror | 15 ms |
| Apply correction to mirror and ramp signal | 1.5 ms |
| Apply fine precession at 800 kHz to one mirror | 15 ms |
| Apply correction to mirror and ramp signal | 1.5 ms |
| Set up time without coarse precession | 34.6 ms |
| Set up time with coarse precession | 88.65 ms |

Table 7 below illustrates an example of the time for aligning mirrors using interstitial photodiodes in an array of MEMS mirrors with an expanded control beam with the same specific set of mirror mechanical properties used in Table 6. The set up time is 5 ms. Aligning the mirrors using photodiodes and an expanded control beam may be about sixteen times faster than aligning using coarse and fine precession.

TABLE 7

| Action | Time |
| --- | --- |
| Interpret set up request, determine mirror pairing, access look-up table, and determine initial voltage values | <100 µs |
| Ramp voltage to mirrors to avoid overshoot | 1.5 ms |
| Determine whether initial optical path is connected | <50 µs |

TABLE 7-continued

| Action | Time |
| --- | --- |
| Collect photodiode response | 100 µs |
| Determine and apply correction vector | <50 µs |
| Ramp voltage to mirrors to avoid overshoot | 1.5 ms |
| Determine if initial optical path is present | <50 µs |
| Measure average powers on photodiodes surrounding both target mirrors | 100 µs |
| Compute corrective angle and phase | <50 µs |
| Apply correction to mirrors and ramp signal | 1.5 ms |
| Set up time with acquisition dithering | 5 µs |

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method of aligning a first mirror and a second mirror of a micro-electro-mechanical system (MEMS) photonic switch, the method comprising:
   receiving, by a first collimator of a first plurality of collimators, a first optical control signal having a control wavelength;
   receiving, by the first collimator, a first optical traffic signal having a traffic wavelength;
   reflecting, by the first mirror on a first mirror array, the first optical control signal to produce a first optical control beam;
   reflecting, by the first mirror, the first optical traffic signal to produce a first optical traffic beam; and
   detecting, by a first photodiode having a first location on a second mirror array, a first intensity of a first control beam spot of the first optical control beam to produce a first detected optical signal, wherein the second mirror array comprises the second mirror, and wherein a first diameter of the first control beam spot is larger than a second diameter of a first traffic beam spot of the first optical traffic beam at the second mirror array.

2. The method of claim 1, further comprising:
   receiving, by a second collimator of a second plurality of collimators, a second optical control signal;
   reflecting, by the second mirror, the second optical control signal to produce a second optical control beam;
   detecting, by a second photodiode of the first mirror array, a second beam spot of the second optical control beam to produce a second detected signal;
   adjusting a first angle of the first mirror; and
   adjusting a second angle of the second mirror.

3. The method of claim 1, wherein the first optical control beam is coaxial with the first optical traffic beam.

4. The method of claim 1, wherein the first diameter of the first control beam spot is larger than a third diameter of the second mirror.

5. The method of claim 4, and wherein the second diameter of the first traffic beam spot is smaller than the third diameter of the second mirror.

6. The method of claim 5, further comprising:
   detecting, by a second photodiode having a second location on the second mirror array, a second intensity of the first control beam spot to produce a second detected optical signal;
   detecting, by a third photodiode having a third location on the second mirror array, a third intensity of the first control beam spot to produce a third detected optical signal; and
   triangulating a center of the first control beam spot in accordance with the first detected optical signal, the second detected optical signal, and the third detected optical signal.

7. The method of claim 6, further comprising:
   determining a correction vector in accordance with the center of the first control beam spot and a center of the second mirror; and
   adjusting the first mirror in accordance with the correction vector.

8. An apparatus configured to align mirrors of a micro-electro-mechanical system (MEMS) photonic switch comprising:
   a first collimator configured to receive a first optical control signal having a control wavelength, and to receive a first optical traffic signal having a traffic wavelength;
   a first mirror array comprising a first mirror, the first mirror configured to reflect a first optical control signal to obtain a first optical control beam, and to reflect the first optical traffic signal to obtain a first optical traffic beam; and
   a second mirror array comprising a second mirror and a first photodiode, the first photodiode having a first location on the second mirror array, the first photodiode configured to detect a first intensity of a first control beam spot of the first optical control beam to obtain a first detected optical signal, wherein the second mirror array comprises the second mirror, and wherein a first diameter of the first control beam spot is larger than a second diameter of a first traffic beam spot of the first optical traffic beam at the second mirror array.

9. The apparatus of claim 8, further comprising:
   a second collimator configured to receive a second optical control signal, wherein the second mirror is configured to reflect the second optical control signal to produce a second optical control beam;
   a second photodiode of the first mirror array, the second photodiode configured to detect a second beam spot of the second optical control beam to obtain a second detected signal; and
   one or more processors configured to adjust a first angle of the first mirror, and adjust a second angle of the second mirror.

10. The apparatus of claim 8, wherein the first optical control beam is coaxial with the first optical traffic beam.

11. The apparatus of claim 8, wherein the first diameter of the first control beam spot is larger than a third diameter of the second mirror.

12. The apparatus of claim 11, and wherein the second diameter of the first traffic beam spot is smaller than the third diameter of the second mirror.

13. The apparatus of claim 12, further comprising:
a second photodiode having a second location on the second mirror array, the second photodiode configured to detect a second intensity of the first control beam spot to obtain a second detected optical signal; and
a third photodiode having a third location on the second mirror array, the third photodiode configured to detect a third intensity of the first control beam spot to produce a third detected optical signal; and
one or more processors configured to triangulate a center of the first control beam spot in accordance with the first detected optical signal, the second detected optical signal, and the third detected optical signal.

14. The apparatus of claim 12, wherein the one or more processors are further configured to determine a correction vector in accordance with the center of the first control beam spot and a center of the second mirror, and to adjust the first mirror in accordance with the correction vector.

15. An apparatus comprising:
a processor; and
a non-transitory computer readable storage medium storing programming for execution by the processor, the programming including instructions to:
receive a first optical control signal having a control wavelength at a first collimator;
receive a first optical traffic signal having a traffic wavelength at the first collimator;
reflect, via the first mirror on a first mirror array, the first optical control signal to produce a first optical control beam;
reflect, via the first mirror, the first optical traffic signal to produce a first optical traffic beam; and
detect, via a first photodiode having a first location on a second mirror array, a first intensity of a first control beam spot of the first optical control beam to produce a first detected optical signal, wherein the second mirror array comprises the second mirror, and wherein a first diameter of the first control beam spot is larger than a second diameter of a first traffic beam spot of the first optical traffic beam at the second mirror array.

16. The apparatus of claim 15, wherein the programming further includes instructions to:
receive a second optical control signal at a second collimator of a second plurality of collimators;
reflect, via a second mirror, the second optical control signal to produce a second optical control beam;
detect, via a second photodiode of the first mirror array, a second beam spot of the second optical control beam to produce a second detected signal;
adjust a first angle of the first mirror; and
adjust a second angle of the second mirror.

17. The apparatus of claim 15, wherein the first optical control beam is coaxial with the first optical traffic beam.

18. The apparatus of claim 15, wherein the first diameter of the first control beam spot is larger than a third diameter of the second mirror, and wherein the second diameter of the first traffic beam spot is smaller than the third diameter of the second mirror.

19. The apparatus of claim 18, wherein the programming further includes instructions to:
detect, via a second photodiode having a second location on the second mirror array, a second intensity of the first control beam spot to produce a second detected optical signal;
detect, via a third photodiode having a third location on the second mirror array, a third intensity of the first control beam spot to produce a third detected optical signal; and
triangulate a center of the first control beam spot in accordance with the first detected optical signal, the second detected optical signal, and the third detected optical signal.

20. The apparatus of claim 19, wherein the programming further includes instructions to:
determine a correction vector in accordance with the center of the first control beam spot and a center of the second mirror; and
adjust the first mirror in accordance with the correction vector.

* * * * *